US012646652B2

(12) United States Patent
Oron et al.

(10) Patent No.: US 12,646,652 B2
(45) Date of Patent: Jun. 2, 2026

(54) BATTERY-OPTIMIZED COMPENSATION SYSTEM

(71) Applicant: BLUEWIND MEDICAL LTD., Herzlia (IL)

(72) Inventors: Gur Oron, Tel Aviv (IL); Eran Benjamin, Tel Aviv (IL); Alexander Firtel, Ashdod (IL); Amiel Greenberg, Rehovot (IL); Yigal Elisha, Tel Aviv (IL)

(73) Assignee: BLUEWIND MEDICAL LTD., Herzlia (IL)

( * ) Notice: Subject to any disclaimer, the term of this patent is extended or adjusted under 35 U.S.C. 154(b) by 715 days.

(21) Appl. No.: 18/058,184

(22) Filed: Nov. 22, 2022

(65) Prior Publication Data

US 2023/0170138 A1     Jun. 1, 2023

Related U.S. Application Data

(60) Provisional application No. 63/282,758, filed on Nov. 24, 2021.

(51) Int. Cl.
*H01F 38/14* (2006.01)
*H04B 5/79* (2024.01)

(52) U.S. Cl.
CPC ............... *H01F 38/14* (2013.01); *H04B 5/79* (2024.01)

(58) Field of Classification Search
CPC ................................. H01F 38/14; H04B 5/79

(Continued)

(56) References Cited

U.S. PATENT DOCUMENTS 3,411,507 A     11/1968     Wingrove
3,693,625 A     9/1972     Auphan
(Continued)

FOREIGN PATENT DOCUMENTS

DE     102008054403     6/2010
EP     0 688 577     12/1995
(Continued)

OTHER PUBLICATIONS

C. de Balthasar, G. Cosendai, M. Hansen, D. Canfield, L. Chu, R. Davis, and J. Schulman, "Attachment of leads to RF-BION® microstimulators." Jul. 2005.

(Continued)

*Primary Examiner* — Richard V Muralidar
(74) *Attorney, Agent, or Firm* — Sughrue Mion, PLLC

(57) ABSTRACT

A housing placeable against skin of a subject includes a transmitting coil. Battery-powered control circuitry including a power stage transmits power to an implant by activating the power stage to drive a current through the transmitting coil to induce an induced current in a receiving coil of the implant. A sensor indicates divergence of a real-time resonance frequency of the transmitting coil with respect to a reference resonance frequency of the transmitting coil at which (a) efficiency of the power stage is at least 70% of a maximum efficiency as a function of the resonance frequency, and (b) the current driven through the transmitting coil is less than 96% of a maximum current drivable through the transmitting coil as a function of the resonance frequency. The circuitry reduces the divergence by tuning the resonance frequency of the transmitting coil. Other applications are also described.

10 Claims, 5 Drawing Sheets

(58) Field of Classification Search
 USPC ........................................................ 320/108
 See application file for complete search history.

(56) References Cited

U.S. PATENT DOCUMENTS

| | | | |
|---|---|---|---|
| 3,727,616 A | 4/1973 | Lenzkes | |
| 4,019,518 A | 4/1977 | Maurer et al. | |
| 4,338,945 A | 7/1982 | Kosugi et al. | |
| 4,392,496 A | 7/1983 | Stanton | |
| 4,535,785 A | 8/1985 | Van Den Honert | |
| 4,559,948 A | 12/1985 | Liss et al. | |
| 4,573,481 A | 3/1986 | Bullara | |
| 4,585,005 A | 4/1986 | Lue et al. | |
| 4,602,624 A | 7/1986 | Naples | |
| 4,608,985 A | 9/1986 | Crish | |
| 4,628,942 A | 12/1986 | Sweeney | |
| 4,632,116 A | 12/1986 | Rosen | |
| 4,649,936 A | 3/1987 | Ungar | |
| 4,663,102 A | 5/1987 | Brenman et al. | |
| 4,739,764 A | 4/1988 | Lau | |
| 4,741,339 A | 5/1988 | Harrison et al. | |
| 4,808,157 A | 2/1989 | Coombs | |
| 4,867,164 A | 9/1989 | Zabara | |
| 4,926,865 A | 5/1990 | Oman | |
| 4,962,751 A | 10/1990 | Krauter | |
| 5,025,807 A | 6/1991 | Zabara | |
| 5,036,854 A | 8/1991 | Schollmeyer et al. | |
| 5,069,680 A | 12/1991 | Grandjean | |
| 5,178,161 A | 1/1993 | Kovacs | |
| 5,188,104 A | 2/1993 | Wernicke | |
| 5,199,428 A | 4/1993 | Obel et al. | |
| 5,199,430 A | 4/1993 | Fang | |
| 5,203,326 A | 4/1993 | Collins | |
| 5,205,285 A | 4/1993 | Baker, Jr. | |
| 5,215,086 A | 6/1993 | Terry, Jr | |
| 5,263,480 A | 11/1993 | Wernicke | |
| 5,282,468 A | 2/1994 | Klepinski | |
| 5,284,479 A | 2/1994 | De Jong | |
| 5,292,344 A | 3/1994 | Douglas | |
| 5,299,569 A | 4/1994 | Wernicke | |
| 5,314,453 A | 5/1994 | Jeutter | |
| 5,314,495 A | 5/1994 | Kovacs | |
| 5,330,507 A | 7/1994 | Schwartz | |
| 5,335,657 A | 8/1994 | Terry, Jr. | |
| 5,411,535 A | 5/1995 | Fujii et al. | |
| 5,423,872 A | 6/1995 | Cigaina | |
| 5,439,938 A | 8/1995 | Synder et al. | |
| 5,454,840 A | 10/1995 | Krakovsky et al. | |
| 5,487,760 A | 1/1996 | Villafana | |
| 5,505,201 A | 4/1996 | Grill, Jr. | |
| 5,509,924 A | 4/1996 | Paspa et al. | |
| 5,540,730 A | 7/1996 | Terry, Jr. | |
| 5,540,733 A | 7/1996 | Testerman et al. | |
| 5,540,734 A | 7/1996 | Zabara | |
| 5,549,655 A | 8/1996 | Erickson | |
| 5,571,150 A | 11/1996 | Wernicke | |
| 5,591,216 A | 1/1997 | Testerman et al. | |
| 5,634,462 A | 6/1997 | Tyler et al. | |
| 5,690,681 A | 11/1997 | Geddes et al. | |
| 5,690,691 A | 11/1997 | Chen | |
| 5,700,282 A | 12/1997 | Zabara | |
| 5,707,400 A | 1/1998 | Terry, Jr. | |
| 5,711,316 A | 1/1998 | Elsberry et al. | |
| 5,716,385 A | 2/1998 | Mittal | |
| 5,755,750 A | 5/1998 | Petruska | |
| 5,776,170 A | 7/1998 | Macdonald et al. | |
| 5,776,171 A | 7/1998 | Peckham | |
| 5,814,089 A | 9/1998 | Stokes | |
| 5,824,027 A | 10/1998 | Hoffer et al. | |
| 5,832,932 A | 11/1998 | Elsberry et al. | |
| 5,833,709 A | 11/1998 | Rise et al. | |
| 5,836,994 A | 11/1998 | Bourgeois | |
| 5,861,019 A | 1/1999 | Sun et al. | |
| 5,898,579 A | 4/1999 | Boys et al. | |
| 5,916,239 A | 6/1999 | Geddes et al. | |
| 5,938,584 A | 8/1999 | Ardito et al. | |
| 5,944,680 A | 8/1999 | Christopherson | |
| 5,954,758 A | 9/1999 | Peckham | |
| 5,991,664 A | 11/1999 | Seligman | |
| 6,002,964 A | 12/1999 | Feler et al. | |
| 6,026,326 A | 2/2000 | Bardy | |
| 6,026,328 A | 2/2000 | Peckham | |
| 6,032,076 A | 2/2000 | Melvin et al. | |
| 6,058,331 A | 5/2000 | King et al. | |
| 6,066,163 A | 5/2000 | John | |
| 6,070,803 A | 6/2000 | Stobbe | |
| 6,071,274 A | 6/2000 | Thompson et al. | |
| 6,083,249 A | 7/2000 | Familoni | |
| 6,086,525 A | 7/2000 | Davey et al. | |
| 6,091,977 A | 7/2000 | Tarjan et al. | |
| 6,091,992 A | 7/2000 | Bourgeois | |
| 6,094,598 A | 7/2000 | Elsberry et al. | |
| 6,097,984 A | 8/2000 | Douglas | |
| 6,104,955 A | 8/2000 | Bourgeois | |
| 6,104,960 A | 8/2000 | Duysens et al. | |
| 6,119,516 A | 9/2000 | Hock | |
| 6,146,335 A | 11/2000 | Gozani | |
| 6,148,232 A | 11/2000 | Avrahami | |
| 6,161,048 A | 12/2000 | Sluijter et al. | |
| 6,169,924 B1 | 1/2001 | Meloy et al. | |
| 6,205,359 B1 | 3/2001 | Boveja | |
| 6,212,435 B1 | 4/2001 | Lattner et al. | |
| 6,214,032 B1 | 4/2001 | Loeb et al. | |
| 6,230,061 B1 | 5/2001 | Hartung | |
| 6,240,316 B1 | 5/2001 | Richmond | |
| 6,246,912 B1 | 6/2001 | Sluijter et al. | |
| 6,266,564 B1 | 7/2001 | Schwartz | |
| 6,272,383 B1 | 8/2001 | Grey | |
| 6,292,703 B1 | 9/2001 | Meier et al. | |
| 6,319,241 B1 | 11/2001 | King | |
| 6,332,089 B1 | 12/2001 | Acker | |
| 6,341,236 B1 | 1/2002 | Osorio et al. | |
| 6,345,202 B2 | 2/2002 | Richmond et al. | |
| 6,356,784 B1 | 3/2002 | Lozano et al. | |
| 6,356,788 B2 | 3/2002 | Boveja | |
| 6,366,813 B1 | 4/2002 | Dilorenzo | |
| 6,405,079 B1 | 6/2002 | Ansarinia | |
| 6,442,432 B2 | 8/2002 | Lee | |
| 6,445,953 B1 | 9/2002 | Bulkes et al. | |
| 6,449,507 B1 | 9/2002 | Hill et al. | |
| 6,456,878 B1 | 9/2002 | Yerich et al. | |
| 6,463,328 B1 | 10/2002 | John | |
| 6,473,644 B1 | 10/2002 | Terry, Jr. et al. | |
| 6,496,729 B2 | 12/2002 | Thompson | |
| 6,496,730 B1 | 12/2002 | Kleckner et al. | |
| 6,582,441 B1 | 6/2003 | He et al. | |
| 6,591,139 B2 | 7/2003 | Loftin et al. | |
| 6,600,954 B2 | 7/2003 | Cohen | |
| 6,600,956 B2 | 7/2003 | Maschino et al. | |
| 6,606,521 B2 | 8/2003 | Paspa et al. | |
| 6,610,713 B2 | 8/2003 | Tracey | |
| 6,618,627 B2 | 9/2003 | Lattner et al. | |
| 6,641,542 B2 | 11/2003 | Cho et al. | |
| 6,682,480 B1 | 1/2004 | Habib et al. | |
| 6,712,772 B2 | 3/2004 | Cohen et al. | |
| 6,721,603 B2 | 4/2004 | Zabara et al. | |
| 6,735,474 B1 | 5/2004 | Loeb et al. | |
| 6,735,475 B1 | 5/2004 | Whitehurst et al. | |
| 6,770,022 B2 | 8/2004 | Mechlenburg | |
| 6,788,973 B2 | 9/2004 | Davis et al. | |
| 6,788,975 B1 | 9/2004 | Whitehurst et al. | |
| 6,804,561 B2 | 10/2004 | Stover | |
| 6,829,508 B2 | 12/2004 | Schulman | |
| 6,839,594 B2 | 1/2005 | Cohen | |
| 6,892,098 B2 | 5/2005 | Ayal | |
| 6,907,295 B2 | 6/2005 | Gross et al. | |
| 6,909,917 B2 | 6/2005 | Woods et al. | |
| 6,950,706 B2 | 9/2005 | Rodriguez et al. | |
| 6,993,384 B2 | 1/2006 | Bradley et al. | |
| 7,015,769 B2 | 3/2006 | Schulman et al. | |
| 7,025,730 B2 | 4/2006 | Cho et al. | |
| 7,027,860 B2 | 4/2006 | Bruninga et al. | |
| 7,047,076 B1 | 5/2006 | Li et al. | |
| 7,054,689 B1 | 5/2006 | Whitehurst et al. | |

(56)                 References Cited

U.S. PATENT DOCUMENTS

| | | | |
|---|---|---|---|
| 7,054,692 | B1 | 5/2006 | Whitehurst et al. |
| 7,110,820 | B2 | 9/2006 | Tcheng et al. |
| 7,149,575 | B2 | 12/2006 | Ostroff et al. |
| 7,151,914 | B2 | 12/2006 | Brewer |
| 7,174,218 | B1 | 2/2007 | Kuzma |
| 7,177,690 | B2 | 2/2007 | Woods et al. |
| 7,177,698 | B2 | 2/2007 | Klosterman et al. |
| 7,190,153 | B2 | 3/2007 | Stover et al. |
| 7,190,998 | B2 | 3/2007 | Shalev et al. |
| 7,203,549 | B2 | 4/2007 | Schommer et al. |
| 7,209,792 | B1 | 4/2007 | Parramon et al. |
| 7,212,867 | B2 | 5/2007 | Venrooij et al. |
| 7,216,000 | B2 | 5/2007 | Sieracki et al. |
| 7,225,032 | B2 | 5/2007 | Schmeling et al. |
| 7,228,178 | B2 | 6/2007 | Carroll |
| 7,239,921 | B2 | 7/2007 | Canfield et al. |
| 7,242,982 | B2 | 7/2007 | Singhal et al. |
| 7,254,449 | B2 | 8/2007 | Karunasiri |
| 7,263,402 | B2 | 8/2007 | Thacker et al. |
| 7,277,748 | B2 | 10/2007 | Wingeier et al. |
| 7,277,749 | B2 | 10/2007 | Gordon et al. |
| 7,286,880 | B2 | 10/2007 | Olson et al. |
| 7,286,881 | B2 | 10/2007 | Schommer et al. |
| 7,289,853 | B1 | 10/2007 | Campbell et al. |
| 7,292,890 | B2 | 11/2007 | Whitehurst et al. |
| 7,308,316 | B2 | 12/2007 | Schommer |
| 7,324,852 | B2 | 1/2008 | Barolat et al. |
| 7,324,853 | B2 | 1/2008 | Ayal |
| 7,330,756 | B2 | 2/2008 | Marnfeldt |
| 7,337,007 | B2 | 2/2008 | Nathan et al. |
| 7,342,508 | B2 | 3/2008 | Morgan et al. |
| 7,363,087 | B2 | 4/2008 | Nghiem et al. |
| 7,376,466 | B2 | 5/2008 | He et al. |
| 7,389,145 | B2 | 6/2008 | Kilgore et al. |
| 7,483,748 | B2 | 1/2009 | Torgerson et al. |
| 7,483,752 | B2 | 1/2009 | Von arx et al. |
| 7,489,561 | B2 | 2/2009 | Armstrong et al. |
| 7,502,652 | B2 | 3/2009 | Gaunt et al. |
| 7,515,012 | B2 | 4/2009 | Schulman et al. |
| 7,515,967 | B2 | 4/2009 | Phillips et al. |
| 7,532,932 | B2 | 5/2009 | Denker et al. |
| 7,536,226 | B2 | 5/2009 | Williams |
| 7,539,538 | B2 | 5/2009 | Parramon et al. |
| 7,561,921 | B2 | 7/2009 | Phillips et al. |
| 7,565,204 | B2 | 7/2009 | Matei |
| 7,628,750 | B2 | 12/2009 | Cohen |
| 7,630,771 | B2 | 12/2009 | Cauller |
| 7,634,313 | B1 | 12/2009 | Kroll et al. |
| 7,643,147 | B2 | 1/2010 | Pless |
| 7,647,117 | B2 | 1/2010 | Bauhahn |
| 7,650,192 | B2 | 1/2010 | Wahlstrand |
| 7,655,014 | B2 | 2/2010 | Ko et al. |
| 7,657,311 | B2 | 2/2010 | Bardy et al. |
| 7,657,317 | B2 | 2/2010 | Thacker et al. |
| 7,657,322 | B2 | 2/2010 | Bardy et al. |
| 7,660,632 | B2 | 2/2010 | Kirby et al. |
| 7,680,538 | B2 | 3/2010 | Durand et al. |
| 7,680,540 | B2 | 3/2010 | Jensen et al. |
| 7,711,434 | B2 | 5/2010 | Denker et al. |
| 7,736,379 | B2 | 6/2010 | Ewers et al. |
| 7,747,325 | B2 | 6/2010 | Dilorenzo |
| 7,748,344 | B2 | 7/2010 | Divergilio et al. |
| 7,780,625 | B2 | 8/2010 | Bardy |
| 7,797,050 | B2 | 9/2010 | Libbus et al. |
| 7,801,602 | B2 | 9/2010 | McClure et al. |
| 7,803,142 | B2 | 9/2010 | Longson et al. |
| 7,809,437 | B2 | 10/2010 | Palmer et al. |
| 7,817,280 | B2 | 10/2010 | Pless |
| 7,822,480 | B2 | 10/2010 | Park et al. |
| 7,848,818 | B2 | 12/2010 | Barolat et al. |
| 7,869,867 | B2 | 1/2011 | Armstrong et al. |
| 7,894,905 | B2 | 2/2011 | Pless et al. |
| 7,899,547 | B1 | 3/2011 | Emadi et al. |
| 7,899,556 | B2 | 3/2011 | Nathan et al. |
| 7,904,171 | B2 | 3/2011 | Parramon et al. |
| 7,912,551 | B2 | 3/2011 | Wosmek |
| 7,917,226 | B2 | 3/2011 | Nghiem |
| 7,925,350 | B1 | 4/2011 | Palmer |
| 7,937,148 | B2 | 5/2011 | Jacobson |
| 7,941,218 | B2 | 5/2011 | Sambelashvili et al. |
| 7,962,211 | B2 | 6/2011 | Torgerson et al. |
| 7,962,220 | B2 | 6/2011 | Kolafa et al. |
| 7,974,706 | B2 | 7/2011 | Moffitt et al. |
| 7,979,126 | B2 | 7/2011 | Payne et al. |
| 7,991,467 | B2 | 8/2011 | Markowitz et al. |
| 7,996,079 | B2 | 8/2011 | Armstrong |
| 7,996,089 | B2 | 8/2011 | Haugland et al. |
| 7,996,092 | B2 | 8/2011 | Mrva et al. |
| 8,005,547 | B2 | 8/2011 | Forsberg et al. |
| 8,019,443 | B2 | 9/2011 | Scheicher et al. |
| 8,050,771 | B2 | 11/2011 | Yamamoto et al. |
| 8,055,336 | B1 | 11/2011 | Schulman et al. |
| 8,055,350 | B2 | 11/2011 | Roberts |
| 8,075,556 | B2 | 12/2011 | Betts |
| 8,086,313 | B2 | 12/2011 | Singhal et al. |
| 8,090,438 | B2 | 1/2012 | Bardy et al. |
| 8,092,412 | B2 | 1/2012 | Sherman |
| 8,115,448 | B2 | 2/2012 | John |
| 8,127,424 | B2 | 3/2012 | Haller et al. |
| 8,131,377 | B2 | 3/2012 | Shhi et al. |
| 8,140,168 | B2 | 3/2012 | Olson et al. |
| 8,170,675 | B2 | 5/2012 | Alataris et al. |
| 8,170,681 | B2 | 5/2012 | Jimenez et al. |
| 8,175,719 | B2 | 5/2012 | Shi et al. |
| 8,177,792 | B2 | 5/2012 | Lubock et al. |
| 8,185,207 | B2 | 5/2012 | Molnar et al. |
| 8,209,021 | B2 | 6/2012 | Alataris et al. |
| 8,219,205 | B2 | 7/2012 | Tseng et al. |
| 8,224,453 | B2 | 7/2012 | De Ridder |
| 8,229,567 | B2 | 7/2012 | Phillips et al. |
| 8,244,367 | B2 | 8/2012 | Wahlstrand et al. |
| 8,255,057 | B2 | 8/2012 | Fang et al. |
| 8,260,432 | B2 | 9/2012 | DiGiore et al. |
| 8,265,770 | B2 | 9/2012 | Toy et al. |
| 8,306,627 | B2 | 11/2012 | Armstrong |
| 8,311,638 | B2 | 11/2012 | Aghassian |
| 8,321,028 | B1 | 11/2012 | Thenuwara et al. |
| 8,335,569 | B2 | 12/2012 | Aghassian |
| 8,355,792 | B2 | 1/2013 | Alataris et al. |
| 8,359,102 | B2 | 1/2013 | Alataris et al. |
| 8,359,103 | B2 | 1/2013 | Alataris et al. |
| 8,364,267 | B2 | 1/2013 | Schleicher et al. |
| 8,369,963 | B2 | 2/2013 | Parramon et al. |
| 8,374,700 | B2 | 2/2013 | Haubrich et al. |
| 8,386,047 | B2 | 2/2013 | Koester |
| 8,386,048 | B2 | 2/2013 | McClure et al. |
| 8,396,559 | B2 | 3/2013 | Alataris et al. |
| 8,428,731 | B2 | 4/2013 | Armstrong |
| 8,428,744 | B2 | 4/2013 | Stancer et al. |
| 8,428,746 | B2 | 4/2013 | DiGiore et al. |
| 8,428,748 | B2 | 4/2013 | Alataris et al. |
| 8,437,846 | B2 | 5/2013 | Swoyer et al. |
| 8,437,853 | B2 | 5/2013 | Inman et al. |
| 8,457,744 | B2 | 6/2013 | Janzig et al. |
| 8,457,759 | B2 | 6/2013 | Parker et al. |
| 8,463,404 | B2 | 6/2013 | Levi et al. |
| 8,473,066 | B2 | 6/2013 | Aghassian et al. |
| 8,478,420 | B2 | 7/2013 | Armstrong et al. |
| 8,483,838 | B2 | 7/2013 | Nghiem et al. |
| 8,483,845 | B2 | 7/2013 | Sage |
| 8,494,640 | B2 | 7/2013 | Peterson et al. |
| 8,494,650 | B2 | 7/2013 | Glukhovsky et al. |
| 8,497,804 | B2 | 7/2013 | Haubrich et al. |
| 8,498,716 | B2 | 7/2013 | Chen et al. |
| 8,509,905 | B2 | 8/2013 | Alataris et al. |
| 8,509,906 | B2 | 8/2013 | Walker et al. |
| 8,515,558 | B1 | 8/2013 | Zweber et al. |
| 8,538,548 | B2 | 9/2013 | Shi et al. |
| 8,543,200 | B2 | 9/2013 | Lane et al. |
| 8,554,326 | B2 | 10/2013 | Alataris et al. |
| 8,555,894 | B2 | 10/2013 | Schulman et al. |
| 8,571,651 | B2 | 10/2013 | Ben-ezra et al. |
| 8,577,474 | B2 | 11/2013 | Rahman et al. |
| 8,588,933 | B2 | 11/2013 | Floyd et al. |

(56)     References Cited

U.S. PATENT DOCUMENTS

| | | | |
|---|---|---|---|
| 8,612,014 B2 | 12/2013 | Rahman et al. | |
| 8,612,019 B2 | 12/2013 | Moffitt | |
| 8,620,435 B2 | 12/2013 | Rooney et al. | |
| 8,620,449 B2 | 12/2013 | Zhao et al. | |
| 8,626,310 B2 | 1/2014 | Barror et al. | |
| 8,634,927 B2 | 1/2014 | Olson et al. | |
| 8,644,947 B2 | 2/2014 | Zhu et al. | |
| 8,644,948 B2 | 2/2014 | Grevious et al. | |
| 8,649,874 B2 | 2/2014 | Alataris et al. | |
| 8,660,655 B2 | 2/2014 | Peterson et al. | |
| 8,665,086 B2 | 3/2014 | Miller et al. | |
| 8,666,491 B2 | 3/2014 | Chen et al. | |
| 8,666,504 B2 | 3/2014 | Dronov et al. | |
| 8,676,337 B2 | 3/2014 | Kallmyer | |
| 8,676,341 B2 | 3/2014 | Kane et al. | |
| 8,688,232 B2 | 4/2014 | Finley et al. | |
| 8,694,108 B2 | 4/2014 | Alataris et al. | |
| 8,694,109 B2 | 4/2014 | Alataris et al. | |
| 8,712,533 B2 | 4/2014 | Alataris et al. | |
| 8,712,534 B2 | 4/2014 | Wei | |
| 8,718,780 B2 | 5/2014 | Lee | |
| 8,718,781 B2 | 5/2014 | Alataris et al. | |
| 8,718,782 B2 | 5/2014 | Alataris et al. | |
| 8,738,145 B2 | 5/2014 | Goetz et al. | |
| 8,750,985 B2 | 6/2014 | Parramon et al. | |
| 8,751,009 B2 | 6/2014 | Wacnik | |
| 8,755,893 B2 | 6/2014 | Gross et al. | |
| 8,761,895 B2 | 6/2014 | Stevenson et al. | |
| 8,768,472 B2 | 7/2014 | Fang et al. | |
| 8,774,912 B2 | 7/2014 | Gerber | |
| 8,774,926 B2 | 7/2014 | Alataris et al. | |
| 8,788,045 B2 | 7/2014 | Gross et al. | |
| 8,792,988 B2 | 7/2014 | Alataris et al. | |
| 8,798,773 B2 | 8/2014 | Mashiach | |
| 8,805,519 B2 | 8/2014 | Parker et al. | |
| 8,812,135 B2 | 8/2014 | Mashiach | |
| 8,831,730 B2 | 9/2014 | Mashiach et al. | |
| 8,843,203 B2 | 9/2014 | Lee et al. | |
| 8,849,410 B2 | 9/2014 | Walker et al. | |
| 8,849,412 B2 | 9/2014 | Perryman et al. | |
| 8,862,239 B2 | 10/2014 | Alataris et al. | |
| 8,868,192 B2 | 10/2014 | Alataris et al. | |
| 8,874,217 B2 | 10/2014 | Alataris et al. | |
| 8,874,219 B2 | 10/2014 | Trier et al. | |
| 8,874,221 B2 | 10/2014 | Alataris et al. | |
| 8,874,222 B2 | 10/2014 | Alataris et al. | |
| 8,880,177 B2 | 11/2014 | Alataris et al. | |
| 8,884,779 B2 | 11/2014 | Herman et al. | |
| 8,886,326 B2 | 11/2014 | Alataris et al. | |
| 8,886,327 B2 | 11/2014 | Alataris et al. | |
| 8,886,328 B2 | 11/2014 | Alataris et al. | |
| 8,892,209 B2 | 11/2014 | Alataris et al. | |
| 8,892,214 B2 | 11/2014 | Bonde et al. | |
| 8,903,497 B2 | 12/2014 | Norgaard et al. | |
| 8,903,499 B2 | 12/2014 | Pless et al. | |
| 8,903,515 B2 | 12/2014 | Mashiach | |
| 8,918,179 B2 | 12/2014 | Peterson et al. | |
| 8,918,180 B2 | 12/2014 | Peterson | |
| 8,923,988 B2 | 12/2014 | Bradley | |
| 8,942,808 B2 | 1/2015 | Peterson et al. | |
| 8,948,871 B2 | 2/2015 | Mashiach et al. | |
| 8,954,165 B2 | 2/2015 | Sharma et al. | |
| 8,958,884 B2 | 2/2015 | Kothandaraman et al. | |
| 8,958,891 B2 | 2/2015 | Kane et al. | |
| 8,983,615 B2 | 3/2015 | Tahmasian et al. | |
| 8,983,618 B2 | 3/2015 | Yamamoto et al. | |
| 8,989,864 B2 | 3/2015 | Funderburk et al. | |
| 8,989,868 B2 | 3/2015 | Mashiach et al. | |
| 8,994,325 B2 | 3/2015 | Carbunaru et al. | |
| 8,996,115 B2 | 3/2015 | Trier et al. | |
| 9,002,445 B2 | 4/2015 | Chen | |
| 9,002,460 B2 | 4/2015 | Parker | |
| 9,002,461 B2 | 4/2015 | Walker et al. | |
| 9,002,466 B2 | 4/2015 | Trier et al. | |
| 9,020,599 B2 | 4/2015 | Rooney et al. | |
| 9,020,602 B2 | 4/2015 | Aghassian | |
| 9,026,227 B2 | 5/2015 | Daglow | |
| 9,030,159 B2 | 5/2015 | Chen et al. | |
| 9,031,653 B2 | 5/2015 | Mashiach | |
| 9,031,666 B2 | 5/2015 | Fell | |
| 9,037,261 B2 | 5/2015 | Bradley | |
| 9,042,997 B2 | 5/2015 | Rahman et al. | |
| 9,044,616 B2 | 6/2015 | Chen et al. | |
| 9,056,206 B2 | 6/2015 | Torgerson et al. | |
| 9,061,140 B2 | 6/2015 | Shi et al. | |
| 9,061,151 B2 | 6/2015 | Mashiach et al. | |
| 9,061,159 B2 | 6/2015 | Rahman | |
| 9,061,162 B2 | 6/2015 | Mashiach et al. | |
| 9,067,072 B2 | 6/2015 | Tahmasian et al. | |
| 9,070,507 B2 | 6/2015 | Dronov et al. | |
| 9,072,896 B2 | 7/2015 | Dar et al. | |
| 9,079,041 B2 | 7/2015 | Park et al. | |
| 9,084,900 B2 | 7/2015 | Hershey et al. | |
| 9,089,712 B2 | 7/2015 | Joshi et al. | |
| 9,095,725 B2 | 8/2015 | Mashiach | |
| 9,095,726 B2 | 8/2015 | Parramon et al. | |
| 9,101,774 B2 | 8/2015 | Mashiach et al. | |
| 9,119,969 B2 | 9/2015 | Vansickle | |
| 9,142,989 B2 | 9/2015 | Fell et al. | |
| 9,149,635 B2 | 10/2015 | Denison et al. | |
| 9,149,643 B2 | 10/2015 | Tahmasian et al. | |
| 9,154,219 B2 | 10/2015 | Polefko et al. | |
| 9,155,899 B2 | 10/2015 | Mashiach et al. | |
| 9,155,901 B2 | 10/2015 | Dearden et al. | |
| 9,162,068 B2 | 10/2015 | Dronov | |
| 9,174,051 B2 | 11/2015 | Marnfeldt et al. | |
| 9,174,053 B2 | 11/2015 | Zhu | |
| 9,186,504 B2 | 11/2015 | Gross | |
| 9,192,770 B2 | 11/2015 | Wang et al. | |
| 9,199,083 B2 | 12/2015 | Caparso et al. | |
| 9,205,258 B2 | 12/2015 | Simon et al. | |
| 9,211,418 B2 | 12/2015 | Aghassian | |
| 9,216,297 B2 | 12/2015 | Kast et al. | |
| 9,220,907 B2 | 12/2015 | Mashiach et al. | |
| 9,220,908 B2 | 12/2015 | Mashiach | |
| 9,220,909 B2 | 12/2015 | Carbunaru et al. | |
| 9,220,910 B2 | 12/2015 | Colborn | |
| 9,225,194 B2 | 12/2015 | Joshi | |
| D747,491 S | 1/2016 | Thompson et al. | |
| 9,227,075 B2 | 1/2016 | Aghassian et al. | |
| 9,232,903 B2 | 1/2016 | Pless et al. | |
| 9,238,138 B2 | 1/2016 | Lee et al. | |
| 9,240,630 B2 | 1/2016 | Joshi | |
| 9,242,106 B2 | 1/2016 | Klosterman et al. | |
| 9,248,279 B2 | 2/2016 | Chen et al. | |
| 9,248,292 B2 | 2/2016 | Trier et al. | |
| 9,248,302 B2 | 2/2016 | Mashiach et al. | |
| 9,252,604 B2 | 2/2016 | Kim | |
| 9,254,393 B2 | 2/2016 | Perryman et al. | |
| 9,259,571 B2 | 2/2016 | Straka et al. | |
| 9,259,582 B2 | 2/2016 | Joshi et al. | |
| 9,259,584 B2 | 2/2016 | Bauhahn et al. | |
| 9,265,941 B2 | 2/2016 | Van Den Biggelaar et al. | |
| 9,265,958 B2 | 2/2016 | Joshi et al. | |
| 9,289,616 B2 | 3/2016 | Koester | |
| 9,295,841 B2 | 3/2016 | Fang et al. | |
| 9,295,850 B2 | 3/2016 | Kallmyer | |
| 9,314,613 B2 | 4/2016 | Mashiach | |
| 9,314,628 B2 | 4/2016 | North et al. | |
| 9,314,642 B2 | 4/2016 | Ozawa et al. | |
| 9,320,847 B2 | 4/2016 | Rooney et al. | |
| 9,320,899 B2 | 4/2016 | Parramon et al. | |
| 9,320,908 B2 | 4/2016 | Fletcher et al. | |
| 9,327,132 B2 | 5/2016 | Mashiach | |
| 9,333,367 B2 | 5/2016 | Chen | |
| 9,339,660 B2 | 5/2016 | Feldman et al. | |
| 9,343,923 B2 | 5/2016 | Joshi | |
| 9,352,161 B2 | 5/2016 | Thacker et al. | |
| 9,370,664 B2 | 6/2016 | Marnfeldt et al. | |
| 9,375,582 B2 | 6/2016 | Kaula et al. | |
| 9,381,360 B2 | 7/2016 | Hershey | |
| 9,387,331 B2 | 7/2016 | Zhao et al. | |
| 9,387,332 B2 | 7/2016 | Zhao et al. | |
| 9,393,423 B2 | 7/2016 | Parramon et al. | |

(56) References Cited

U.S. PATENT DOCUMENTS

| | | | |
|---|---|---|---|
| 9,393,428 B2 | 7/2016 | Nyberg, II et al. |
| 9,393,435 B2 | 7/2016 | Mashiach |
| 9,398,901 B2 | 7/2016 | Tischendorf et al. |
| 9,399,130 B2 | 7/2016 | Bonde et al. |
| 9,399,131 B2 | 7/2016 | Digiore et al. |
| 9,399,143 B2 | 7/2016 | Yamamoto et al. |
| 9,403,013 B2 | 8/2016 | Walker et al. |
| 9,403,020 B2 | 8/2016 | Wingeier |
| 9,403,021 B2 | 8/2016 | Dronov |
| 9,407,110 B2 | 8/2016 | Lui et al. |
| 9,409,029 B2 | 8/2016 | Perryman et al. |
| 9,435,830 B2 | 9/2016 | Joshi |
| 9,446,251 B1 | 9/2016 | Perryman et al. |
| 9,446,254 B2 | 9/2016 | Ozawa et al. |
| 9,449,501 B2 | 9/2016 | Grevious et al. |
| 9,452,288 B2 | 9/2016 | Whitehurst et al. |
| 9,457,186 B2 | 10/2016 | Gross |
| 9,463,321 B2 | 10/2016 | Bradley et al. |
| 9,463,323 B2 | 10/2016 | Lee et al. |
| 9,463,326 B2 | 10/2016 | Ranu |
| 9,468,771 B2 | 10/2016 | Griffith et al. |
| 9,468,772 B2 | 10/2016 | Demmer |
| 9,469,437 B2 | 10/2016 | Kamath |
| 9,474,905 B2 | 10/2016 | Doan et al. |
| 9,480,841 B2 | 11/2016 | Hershey et al. |
| 9,504,832 B2 | 11/2016 | Libbus et al. |
| 9,504,838 B2 | 11/2016 | Rao et al. |
| 9,511,238 B2 | 12/2016 | Mashiach |
| 9,517,344 B1 | 12/2016 | Bradley |
| 9,517,352 B2 | 12/2016 | Kast et al. |
| 9,522,270 B2 | 12/2016 | Perryman et al. |
| 9,526,906 B2 | 12/2016 | Mashiach |
| 9,533,148 B2 | 1/2017 | Carcieri |
| 9,533,153 B2 | 1/2017 | Libbus et al. |
| 9,533,154 B2 | 1/2017 | Kothandaraman et al. |
| 9,533,162 B2 | 1/2017 | Ter-petrosyan et al. |
| 9,555,257 B2 | 1/2017 | Mashiach et al. |
| 9,561,365 B2 | 2/2017 | Shi et al. |
| 9,585,642 B2 | 3/2017 | Dinsmoor et al. |
| 9,586,054 B2 | 3/2017 | Aghassian |
| 9,592,385 B2 | 3/2017 | Kaula et al. |
| 9,597,516 B2 | 3/2017 | Lee et al. |
| 9,597,517 B2 | 3/2017 | Moffitt |
| 9,597,521 B2 | 3/2017 | Plotkin et al. |
| 9,610,450 B2 | 4/2017 | Zhao |
| 9,616,230 B2 | 4/2017 | Grandhe |
| 9,623,244 B2 | 4/2017 | Kothandaraman |
| 9,623,245 B2 | 4/2017 | King et al. |
| 9,623,253 B2 | 4/2017 | Perryman et al. |
| 9,623,257 B2 * | 4/2017 | Olson .................. A61N 1/3787 |
| 9,630,231 B2 | 4/2017 | Kelsch et al. |
| 9,636,508 B2 | 5/2017 | Chen et al. |
| 9,643,022 B2 | 5/2017 | Mashiach et al. |
| 9,649,049 B2 | 5/2017 | Pless et al. |
| 9,649,493 B2 | 5/2017 | Mashiach |
| 9,653,941 B2 | 5/2017 | Dinsmoor et al. |
| 9,656,074 B2 | 5/2017 | Simon et al. |
| 9,656,076 B2 | 5/2017 | Trier et al. |
| 9,656,081 B2 | 5/2017 | Feldman et al. |
| 9,675,809 B2 | 6/2017 | Chow |
| 9,687,649 B2 | 6/2017 | Thacker |
| 9,700,725 B2 | 7/2017 | Zhu |
| 9,700,730 B2 | 7/2017 | Carbunaru et al. |
| 9,707,404 B2 | 7/2017 | Rao et al. |
| 9,713,707 B2 | 7/2017 | Oron et al. |
| 9,713,717 B2 | 7/2017 | Aghassian |
| 9,713,718 B2 | 7/2017 | Lamont et al. |
| 9,713,721 B2 | 7/2017 | Kothandaraman |
| 9,724,513 B2 | 8/2017 | Lane et al. |
| 9,731,116 B2 | 8/2017 | Chen |
| 9,737,703 B2 | 8/2017 | Carbunaru et al. |
| 9,737,714 B2 | 8/2017 | Zottola |
| 9,744,347 B2 | 8/2017 | Chen et al. |
| 9,744,362 B2 | 8/2017 | Steinke et al. |
| 9,744,365 B2 | 8/2017 | Davis et al. |
| 9,744,368 B2 | 8/2017 | Dinsmoor |
| 9,750,930 B2 | 9/2017 | Chen |
| 9,782,588 B2 | 10/2017 | Shi et al. |
| 9,782,593 B2 | 10/2017 | Parramon et al. |
| 9,782,596 B2 | 10/2017 | Vamos et al. |
| 9,789,314 B2 | 10/2017 | Perryman et al. |
| 9,789,321 B2 | 10/2017 | Dixit et al. |
| 9,789,324 B2 | 10/2017 | Bauhahn et al. |
| 9,802,038 B2 | 10/2017 | Lee et al. |
| 9,802,048 B2 | 10/2017 | Armstrong |
| 9,802,052 B2 | 10/2017 | Marnfeldt |
| 9,814,458 B2 | 11/2017 | North |
| 9,814,880 B2 | 11/2017 | Hershey et al. |
| 9,814,884 B2 | 11/2017 | Parker et al. |
| 9,839,786 B2 | 12/2017 | Rondoni et al. |
| 9,844,677 B2 | 12/2017 | Aghassian |
| 9,849,298 B2 | 12/2017 | Ozawa et al. |
| 9,855,032 B2 | 1/2018 | Mashiach et al. |
| 9,855,436 B2 | 1/2018 | Dearden et al. |
| 9,861,825 B2 | 1/2018 | Ozawa et al. |
| 9,867,989 B2 | 1/2018 | Blum et al. |
| 9,867,994 B2 | 1/2018 | Parramon |
| 9,878,158 B2 | 1/2018 | Hershey et al. |
| 9,907,967 B2 | 3/2018 | Mashiach et al. |
| 9,913,980 B2 | 3/2018 | Ostroff et al. |
| 9,913,983 B2 | 3/2018 | Gustafsson et al. |
| 9,913,986 B2 | 3/2018 | Chow et al. |
| 9,913,990 B2 | 3/2018 | Ter-petrosyan et al. |
| 9,925,381 B2 | 3/2018 | Nassif |
| 9,929,584 B2 | 3/2018 | Aghassian et al. |
| 9,931,107 B2 | 4/2018 | Tischendorf et al. |
| 9,935,498 B2 | 4/2018 | Joshi |
| 9,943,685 B2 | 4/2018 | Ramesh et al. |
| 9,950,166 B2 | 4/2018 | Mashiach et al. |
| 9,950,173 B2 | 4/2018 | Doan |
| 9,950,179 B2 | 4/2018 | Bonde et al. |
| 9,956,419 B2 | 5/2018 | Bokil |
| 9,956,421 B2 | 5/2018 | Bunyan et al. |
| 9,974,965 B2 | 5/2018 | Perryman et al. |
| 9,981,130 B2 | 5/2018 | Lee |
| 9,993,645 B2 | 6/2018 | Walker et al. |
| 10,010,717 B2 | 7/2018 | Aghassian et al. |
| 10,014,571 B2 | 7/2018 | Andersen et al. |
| 10,052,097 B2 | 8/2018 | Mashiach et al. |
| 10,056,688 B2 | 8/2018 | Andersen et al. |
| 10,058,705 B2 | 8/2018 | Andersen et al. |
| 10,064,288 B2 | 8/2018 | Li et al. |
| 10,080,902 B2 | 9/2018 | Dinsmoor et al. |
| 10,105,540 B2 | 10/2018 | Oron et al. |
| 10,105,542 B2 | 10/2018 | Jiang et al. |
| 10,105,543 B2 | 10/2018 | Marnfeldt et al. |
| 10,118,040 B2 | 11/2018 | Zhu |
| 10,143,845 B2 | 12/2018 | Kothandaraman |
| 10,149,976 B1 | 12/2018 | Andresen et al. |
| 10,173,062 B2 | 1/2019 | Parker |
| 10,177,609 B2 | 1/2019 | Olson et al. |
| 10,179,241 B2 | 1/2019 | Walker et al. |
| 10,182,807 B2 | 1/2019 | Bridgeman et al. |
| 10,195,425 B2 | 2/2019 | Ostroff et al. |
| 10,213,608 B2 | 2/2019 | Moffitt |
| 10,219,229 B1 | 2/2019 | Mulligan, IV |
| 10,226,637 B2 | 3/2019 | Aghassian et al. |
| 10,532,208 B2 | 1/2020 | Ostroff et al. |
| 10,583,284 B2 | 3/2020 | Peters et al. |
| 11,083,903 B2 | 8/2021 | Nassif et al. |
| 11,213,685 B2 | 1/2022 | Oron et al. |
| 2002/0077554 A1 | 6/2002 | Schwartz et al. |
| 2002/0099419 A1 | 7/2002 | Cohen et al. |
| 2002/0124848 A1 | 9/2002 | Sullivan et al. |
| 2002/0183805 A1 | 12/2002 | Fang et al. |
| 2002/0183817 A1 | 12/2002 | Van Venrooij et al. |
| 2003/0014016 A1 | 1/2003 | Purdy |
| 2003/0040774 A1 | 2/2003 | Terry et al. |
| 2003/0060858 A1 | 3/2003 | Kieval et al. |
| 2003/0100933 A1 | 5/2003 | Ayal |
| 2003/0176898 A1 | 9/2003 | Gross et al. |
| 2003/0234631 A1 * | 12/2003 | Schulman .................. H03J 5/02 |
| | | | 318/677 |
| 2003/0236557 A1 | 12/2003 | Whitehurst et al. |

(56)  References Cited

U.S. PATENT DOCUMENTS

| | | |
|---|---|---|
| 2003/0236558 A1 | 12/2003 | Whitehurst et al. |
| 2004/0015205 A1 | 1/2004 | Whitehurst et al. |
| 2004/0019368 A1 | 1/2004 | Lattner et al. |
| 2004/0048795 A1 | 3/2004 | Ivanova et al. |
| 2004/0073270 A1 | 4/2004 | Firlik et al. |
| 2004/0167584 A1 | 8/2004 | Carroll et al. |
| 2004/0249431 A1 | 12/2004 | Ransbury et al. |
| 2004/0254612 A1 | 12/2004 | Ezra et al. |
| 2004/0254624 A1 | 12/2004 | Johnson |
| 2005/0119716 A1 | 6/2005 | McClure et al. |
| 2005/0131495 A1 | 6/2005 | Parramon et al. |
| 2005/0143789 A1 | 6/2005 | Whitehurst |
| 2005/0165457 A1 | 7/2005 | Benser et al. |
| 2005/0182457 A1 | 8/2005 | Thrope et al. |
| 2005/0251061 A1 | 11/2005 | Schuler et al. |
| 2006/0020305 A1 | 1/2006 | Desai et al. |
| 2006/0047327 A1 | 3/2006 | Colvin et al. |
| 2006/0085039 A1 | 4/2006 | Hastings et al. |
| 2006/0100668 A1 | 5/2006 | Ben-David et al. |
| 2006/0155345 A1 | 7/2006 | Williams et al. |
| 2006/0271137 A1 | 11/2006 | Stanton-Hicks |
| 2007/0032827 A1 | 2/2007 | Katims |
| 2007/0067000 A1 | 3/2007 | Strother et al. |
| 2007/0067007 A1 | 3/2007 | Schulman |
| 2007/0073353 A1 | 3/2007 | Rooney et al. |
| 2007/0073354 A1 | 3/2007 | Knudson et al. |
| 2007/0083240 A1 | 4/2007 | Peterson et al. |
| 2007/0088397 A1 | 4/2007 | Jacobson |
| 2007/0173893 A1 | 7/2007 | Pitts |
| 2007/0208392 A1 | 9/2007 | Kuschner et al. |
| 2007/0255349 A1 | 11/2007 | Torgerson et al. |
| 2007/0293908 A1 | 12/2007 | Cowan et al. |
| 2007/0293912 A1 | 12/2007 | Cowan et al. |
| 2008/0004535 A1 | 1/2008 | Smits |
| 2008/0009914 A1 | 1/2008 | Buysman et al. |
| 2008/0021336 A1 | 1/2008 | Dobak |
| 2008/0027513 A1 | 1/2008 | Carbunaru |
| 2008/0039915 A1 | 2/2008 | Van Den Biggelaar |
| 2008/0065182 A1 | 3/2008 | Strother et al. |
| 2008/0071178 A1 | 3/2008 | Greenland et al. |
| 2008/0091255 A1 | 4/2008 | Caparso et al. |
| 2008/0103407 A1 | 5/2008 | Bolea et al. |
| 2008/0103572 A1 | 5/2008 | Gerber |
| 2008/0109054 A1 | 5/2008 | Hastings et al. |
| 2008/0119911 A1 | 5/2008 | Rosero |
| 2008/0132964 A1 | 6/2008 | Cohen et al. |
| 2008/0183235 A1 | 7/2008 | Stancer et al. |
| 2008/0269740 A1 | 10/2008 | Bonde et al. |
| 2009/0012590 A1 | 1/2009 | Inman et al. |
| 2009/0036975 A1 | 2/2009 | Ward et al. |
| 2009/0048642 A1 | 2/2009 | Goroszeniuk |
| 2009/0149912 A1 | 6/2009 | Dacey et al. |
| 2009/0152954 A1 | 6/2009 | Le et al. |
| 2009/0182402 A1 | 7/2009 | Glukhovsky |
| 2009/0204170 A1 | 8/2009 | Hastings et al. |
| 2009/0204173 A1 | 8/2009 | Fang et al. |
| 2009/0234407 A1 | 9/2009 | Hastings et al. |
| 2009/0259280 A1 | 10/2009 | Wilkin et al. |
| 2009/0270951 A1 | 10/2009 | Kallmyer |
| 2009/0281594 A1 | 11/2009 | King et al. |
| 2009/0326602 A1 | 12/2009 | Glukhovsky et al. |
| 2010/0069992 A1 | 3/2010 | Aghassian et al. |
| 2010/0094367 A1 | 4/2010 | Sen |
| 2010/0121405 A1 | 5/2010 | Ternes et al. |
| 2010/0125310 A1 | 5/2010 | Wilson et al. |
| 2010/0125313 A1 | 5/2010 | Lee et al. |
| 2010/0198298 A1 | 8/2010 | Glukovsky et al. |
| 2010/0211131 A1 | 8/2010 | Williams et al. |
| 2010/0241195 A1 | 9/2010 | Meadows et al. |
| 2010/0244580 A1 | 9/2010 | Uchida et al. |
| 2010/0249875 A1 | 9/2010 | Kishawi et al. |
| 2010/0280568 A1 | 11/2010 | Bulkes et al. |
| 2010/0305392 A1 | 12/2010 | Gross et al. |
| 2010/0312320 A1 | 12/2010 | Faltys et al. |
| 2010/0324630 A1 | 12/2010 | Lee et al. |

| | | |
|---|---|---|
| 2011/0034782 A1 | 2/2011 | Sugimachi et al. |
| 2011/0046696 A1 | 2/2011 | Barolat et al. |
| 2011/0087337 A1 | 4/2011 | Forsell |
| 2011/0093036 A1 | 4/2011 | Mashiach |
| 2011/0112605 A1 | 5/2011 | Fahey |
| 2011/0137365 A1 | 6/2011 | Ben-Erza et al. |
| 2011/0152965 A1 | 6/2011 | Mashiach |
| 2011/0160792 A1 | 6/2011 | Fishel |
| 2011/0160793 A1 | 6/2011 | Gindele |
| 2011/0160798 A1 | 6/2011 | Ackermann et al. |
| 2011/0208260 A1 | 8/2011 | Jacobson |
| 2011/0208271 A1 | 8/2011 | Dobak |
| 2011/0224744 A1 | 9/2011 | Moffitt et al. |
| 2011/0224769 A1 | 9/2011 | Spenser et al. |
| 2011/0230922 A1 | 9/2011 | Fishel |
| 2011/0270339 A1 | 11/2011 | Murray et al. |
| 2011/0282412 A1 | 11/2011 | Glukhovsky et al. |
| 2011/0301662 A1 | 12/2011 | Bar-Yoseph et al. |
| 2011/0301670 A1 | 12/2011 | Gross |
| 2012/0004709 A1 | 1/2012 | Chen et al. |
| 2012/0010694 A1 | 1/2012 | Lutter et al. |
| 2012/0035679 A1 | 2/2012 | Dagan et al. |
| 2012/0041511 A1 | 2/2012 | Lee |
| 2012/0041514 A1 | 2/2012 | Gross et al. |
| 2012/0065701 A1 | 3/2012 | Cauller |
| 2012/0083857 A1 | 4/2012 | Bradley et al. |
| 2012/0101326 A1 | 4/2012 | Simon et al. |
| 2012/0123498 A1 | 5/2012 | Gross |
| 2012/0130448 A1 | 5/2012 | Woods et al. |
| 2012/0130463 A1 | 5/2012 | Ben-David et al. |
| 2012/0158081 A1 | 6/2012 | Gross et al. |
| 2012/0215285 A1 | 8/2012 | Tahmasian et al. |
| 2012/0256494 A1 | 10/2012 | Kesler et al. |
| 2012/0296389 A1 | 11/2012 | Fang et al. |
| 2013/0006326 A1 | 1/2013 | Ackermann et al. |
| 2013/0066393 A1 | 3/2013 | Gross et al. |
| 2013/0192611 A1 | 8/2013 | Taepke, II et al. |
| 2013/0289662 A1 | 10/2013 | Olson et al. |
| 2013/0325084 A1 | 12/2013 | Lee |
| 2014/0031840 A1 | 1/2014 | Mashiach |
| 2014/0031903 A1 | 1/2014 | Mashiach |
| 2014/0184150 A1 | 7/2014 | Walley |
| 2014/0214134 A1 | 7/2014 | Peterson |
| 2014/0296940 A1 | 10/2014 | Gross |
| 2015/0004709 A1 | 1/2015 | Nazarpoor |
| 2015/0018598 A1 | 1/2015 | Nabutovsky et al. |
| 2015/0018728 A1 | 1/2015 | Gross et al. |
| 2015/0039046 A1 | 2/2015 | Gross |
| 2015/0080979 A1 | 3/2015 | Lasko et al. |
| 2015/0100109 A1 | 4/2015 | Feldman et al. |
| 2015/0148861 A1 | 5/2015 | Gross |
| 2015/0148878 A1 | 5/2015 | Yoo et al. |
| 2015/0174406 A1 | 6/2015 | Lamensdorf et al. |
| 2015/0202449 A1 | 7/2015 | Chen |
| 2015/0258339 A1 | 9/2015 | Burchiel et al. |
| 2015/0270719 A1 | 9/2015 | Kurs et al. |
| 2015/0335882 A1 | 11/2015 | Gross et al. |
| 2016/0206882 A1 | 7/2016 | Oron et al. |
| 2016/0206889 A1 | 7/2016 | Plotkin et al. |
| 2016/0206890 A1 | 7/2016 | Oron et al. |
| 2016/0294366 A1 | 10/2016 | Bao et al. |
| 2016/0361544 A1 | 12/2016 | Oron et al. |
| 2017/0007829 A1 | 1/2017 | Gross |
| 2017/0128724 A1 | 5/2017 | Oron et al. |
| 2017/0136232 A1 | 5/2017 | Oron et al. |
| 2017/0224996 A1 | 8/2017 | Oron et al. |
| 2017/0232255 A1 | 8/2017 | Kent et al. |
| 2017/0296426 A1 | 10/2017 | Oron et al. |
| 2018/0353764 A1 | 12/2018 | Oron et al. |
| 2020/0046974 A1 | 2/2020 | Ostroff et al. |
| 2020/0139136 A1 | 5/2020 | Oron et al. |
| 2022/0168580 A1 | 6/2022 | Oron et al. |
| 2022/0355120 A1 | 11/2022 | Oron et al. |

FOREIGN PATENT DOCUMENTS

| | | |
|---|---|---|
| EP | 1533000 | 5/2005 |
| EP | 1703638 | 11/2012 |
| WO | 1998/010832 | 3/1998 |

(56) References Cited

FOREIGN PATENT DOCUMENTS

| WO | 1999/026530 | 6/1999 |
|----|-------------|--------|
| WO | 01/10432 | 2/2001 |
| WO | 2001/010375 | 2/2001 |
| WO | 01/26729 | 4/2001 |
| WO | 02/09808 | 2/2002 |
| WO | 2004/064729 | 8/2004 |
| WO | 2006/102626 | 9/2006 |
| WO | 2007/019491 | 2/2007 |
| WO | 2009/055574 | 4/2009 |
| WO | 2009/110935 | 9/2009 |
| WO | 2011/154937 | 12/2011 |
| WO | 2012/012591 | 1/2012 |
| WO | 2013/035092 | 3/2013 |
| WO | 2013/106884 | 7/2013 |
| WO | 2013/111137 | 8/2013 |
| WO | 2013/156038 | 10/2013 |
| WO | 2013/164829 | 11/2013 |
| WO | 2014/081978 | 5/2014 |
| WO | 2014/087337 | 6/2014 |
| WO | 2014/167568 | 10/2014 |
| WO | 2015/004673 | 1/2015 |
| WO | 2016/028608 | 2/2016 |
| WO | 2016/157183 | 10/2016 |
| WO | 2016/172109 | 10/2016 |

OTHER PUBLICATIONS

D.W. Eisele, A.R. Schwartz, and P. L. Smith, "Tongue neuromuscular and direct hypoglossal nerve stimulation for obstructive sleep apnea.," Otolaryngologic clinics of North America, vol. 36, 2003, p. 501.

G.E. Loeb, F.J.R. Richmond, J. Singh, R.A. Peck, W. Tan, Q. Zou, and N. Sachs, "RF-powered BIONs™ for stimulation and sensing," Engineering in Medicine and Biology Society, 2004. IEMBS'04. 26th Annual International Conference of the IEEE, 2005, pp. 4182-4185.

G.E. Loeb, F.J. Richmond, and L.L. Baker, "The BION devices: injectable interfaces with peripheral nerves and muscles," Neurosurgical focus, vol. 20, 2006, pp. 1-9.

E.A. Mann, T. Burnett, S. Cornell, and C.L. Ludlow, "The effect of neuromuscular stimulation of the genioglossus on the hypopharyngeal airway," The Laryngoscope, vol. 112, 2002, pp. 351-356.

A. Oliven, R.P. Schnall, G. Pillar, N. Gavriely, and M. Odeh, "Sublingual electrical stimulation of the tongue during wakefulness and sleep," Respiration physiology, vol. 127, 2001, pp. 217-226.

A. Oliven, D.J. O'Hearn, A. Boudewyns, M. Odeh, W. De Backer, P. van de Heyning, P.L. Smith, D.W. Eisele, L. Allan, H. Schneider, and others, "Upper airway response to electrical stimulation of the genioglossus in obstructive sleep apnea," Journal of Applied Physiology, vol. 95, 2003, p. 2023.

A. Oliven, M. Odeh, L. Geitini, R. Oliven, U. Steinfeld, A.R. Schwartz, and N. Tov, "Effect of coactivation of tongue protrusor and retractor muscles on pharyngeal lumen and airflow in sleep apnea patients," Journal of Applied Physiology, vol. 103, 2007, p. 1662.

A.R. Schwartz, D.W. Eisele, A. Hari, R. Testerman, D. Erickson, and P.L. Smith, "Electrical stimulation of the lingual musculature in obstructive sleep apnea," Journal of Applied Physiology, vol. 81, 1996, p. 643.

W.H. Tran, G.E. Loeb, F.J.R. Richmond, A.C. Dupont, K.C. Mahutte, C.S.H. Sassoon, and M.J. Dickel, "Development of asynchronous, intralingual electrical stimulation to treat obstructive sleep apnea," Engineering in Medicine and Biology Society, 2003. Proceedings of the 25th Annual International Conference of the IEEE, 2004, pp. 375-378.

W.H. Tran, G.E. Loeb, F.J.R. Richmond, R. Ahmed, G.T. Clark, and P.B. Haberman, "First subject evaluated with simulated BION™ treatment in genioglossus to prevent obstructive sleep apnea," Engineering in Medicine and Biology Society, 2004. IEMBS'04. 26th Annual International Conference of the IEEE, 2005, pp. 4287-4289.

P.R. Troyk, "Injectable electronic identification, monitoring, and stimulation systems," Biomedical Engineering, vol. 1, 1999, p. 177.

T.K. Whitehurst, J.H. Schulman, K.N. Jaax, and R. Carbunaru, "The Bion® Microstimulator and its Clinical Applications," Implantable Neural Prostheses 1, 2009, pp. 253-273.

D.J. Young, "Wireless powering and data telemetry for biomedical implants," Engineering in Medicine and Biology Society, 2009. EMBC 2009. Annual International Conference of the IEEE, 2009, pp. 3221-3224.

Reid R. Harrison, et al., "Wireless Neural Recording with Single Low-Power Integrated Circuit", IEEE Trans Neural Syst Rehabil Eng. Aug. 2009; 17(4):322-329.

An International Search Report and a Written Opinion both dated Apr. 17, 2012 which issued during the prosecution of Applicant's PCT/IL11/00870.

Patents Galore: Implantable Neurostimulators Fight Snoring and Corpse Eye-Proof Scanners. Printout from http://medgadget.com/2006/03/patents_galore.html (Downloaded Jan. 2012).

Chris Seper, "Neuros Medical Launches to Develop New Device to Block Amputee, Chronic Pain", Mar. 17, 2009.

Urgent® PC, Simple. Safe. Effective. Neuromodulation System, Uroplasty, Mar. 2009.

"JumpStart and Case Technology Ventures Invest in Neuros Medical", CTV Case Technology Ventures, Mar. 17, 2009.

"Responses to median and tibial nerve stimulation in patients with chronic neuropathic pain", by Theuvenet, Brain Topography, vol. 11, No. 4, 1999, pp. 305-313(9)—an abstract.

Armstrong, J, "Is electrical stimulation effective in reducing neuropathic pain in patients with diabetes?", by Foot Ankle Surg. Jul.-Aug. 1997; 36(4):260-3—an abstract.

Ross Davis, Cerebellar Stimulation for Cerebral Palsy Spasticity, Function and Seizures. Clinical Neuroscience Center, 1999. pp. 290-299.

An Office Action dated Feb. 13, 2004, which issued during the prosecution of U.S. Appl. No. 10/254,024.

Bathien et al., Inhibition and synchronisation of tremor induced by a muscle twitch. J. Neurol, Neurosurg. And Psych. 1980, 43, 713-718.

Jobges et al., Vibratory proprioceptive stimulation affects Parkinsonian tremor. Parkinsonism & Related Disorders, 8(3), 171-176, Jan. 2002.

Mones and Weiss, The response of the tremor of patients with Parkinsonism to peripheral nerve stimulation. J. Neurol. Neurosurg. Psychiat. 1969, 32. 512-519.

Y. Zhang, et al., "Optimal Ventricular Rate Slowing During Atrial Fibrillation by Feedback AV Nodal-Selective Vagal Stimulation", Am J Physiol Heart Circ Physiol 282:H1102-H1110, 2002.

N.J.M Rijkhoff, et al., "Selective Stimulation of Small Diameter Nerve Fibers in a Mixed Bundle", Proceedings of the Annual Project Meeting Sensations/Neuros and Mid Term Review Meeting Neuros, Apr. 21-23, 1999.

M. Manfredi, "Differential Block of conduction of larger fibers in peripheral nerve by direct current", Arch. Ital. Biol. 108:52-71, 1970.

A Restriction Requirement dated May 11, 2012, which issued during the prosecution of U.S. Appl. No. 12/946,246.

Cerebral Palsy, Barry S. Russman MD, CCurrent Science Inc. 2000.

A Notice of Allowance dated Mar. 7, 2005, which issued during the prosecution of U.S. Appl. No. 10/254,024.

A Notice of Allowance dated Aug. 26, 2004, which issued during the prosecution of U.S. Appl. No. 10/254,024.

An Office Action dated Jun. 24, 2011, which issued during the prosecution of U.S. Appl. No. 12/796,102.

An International Search Report and a Written Opinion both dated Nov. 14, 2011, which issued during the prosecution of Applicant's PCT/IL2011/000440.

An International Preliminary Report on Patentability dated Dec. 10, 2012, which issued during the prosecution of Applicant's PCT/IL2011/000440.

U.S. Appl. No. 60/263,834, filed Jan. 2, 2001.

Sweeney JD et al., "An asymmetric two electrode cuff for generation of unidirectionally propagated action potentials," IEEE Transactions on Biomedical Engineering, vol. BME-33(6) (1986).

(56) References Cited

OTHER PUBLICATIONS

An Office Action dated Apr. 9, 2012, which issued during the prosecution of U.S. Appl. No. 12/796,102.

Invitation to pay Additional Fees dated May 10, 2013 which issued during the prosecution of Applicant's PCT/IL2013/050069.

Naples GG et al., "A spiral nerve cuff electrode for peripheral nerve stimulation," by IEEE Transactions on Biomedical Engineering, 35(11) (1988).

Sweeney JD et al., "A nerve cuff technique for selective excitation of peripheral nerve trunk regions," IEEE Transactions on Biomedical Engineering, 37(7) (1990).

Ungar IJ et al., "Generation of unidirectionally propagating action potentials using a monopolar electrode cuff," Annals of Biomedical Engineering, 14:437-450 (1986).

Fitzpatrick et al., in "A nerve cuff design for the selective activation and blocking of myelinated nerve fibers," Ann. Conf. of the IEEE Eng. in Medicine and Biology Soc, 13(2), 906 (1991).

Rijkhoff NJ et al., "Orderly recruitment of motoneurons in an acute rabbit model," Ann. Conf. of the IEEE Eng., Medicine and Biology Soc., 20(5):2564 (1998).

Van den Honert C et al., "A technique for collision block of peripheral nerve: Frequency dependence," MP-12, IEEE Trans. Biomed. Eng. 28:379-382 (1981).

Baratta R et al., "Orderly stimulation of skeletal muscle motor units with tripolar nerve cuff electrode," IEEE Transactions on Biomedical Engineering, 36(8):836-43 (1989).

Van den Honert C et al., "Generation of unidirectionally propagated action potentials in a peripheral nerve by brief stimuli," Science, 206:1311-1312 (1979).

M. Devor, "Pain Networks", Handbook of Brand Theory and Neural Networks, Ed M.A. Arbib MIT Press pp. 696-701, 1998.

Epilepsy center. http://www.bcm.tmc.edu/neural/struct/epilep/epilpsy_vagus.html.

J.F. Cortese, "Vagus Nerve Stimulation for Control of Intractable Epileptic Seizures", May 31, 2001.

Evetovich T.K. et al., Gender comparisons of the mechanomyographic responses to minimal concentric and eccentric isokinetic muscle actions, Medicine & Science in Sports & Exercise, 1998 pp. 1697-1702. Abstract.

An Office Action dated Dec. 5, 2013, which issued during the prosecution of U.S. Appl. No. 13/528,433.

An Office Action dated Sep. 30, 2013, which issued during the prosecution of U.S. Appl. No. 12/796,102.

Chow et al., Evaluation of Cardiovascular Stents as Antennas for Implantable Wireless Applications, IEEE Transactions on Microwave Theory and Techniques, vol. 57, No. 10, Oct. 2009.

Dean, J. et al., "Motor Pattern Generation", Handbook of Brain Theory and Neural Networks, pp. 696-701.

Hu et al., Percutaneous Biphasic Electrical Stimulation for Treatment of Obstructive Sleep Apnea Syndrome, IEEE Transactions on Biomedical Engineering, Jan. 2008 vol. 55 Issue: 1 p. 181-187—an abstract.

A. Oliven, Electrical stimulation of the genioglossus to improve pharyngeal patency in obstructive sleep apnea: comparison of resultsobtained during sleep and anesthesia, U.S. National Library of Medicine, National Institutes of Health May 2009;148(5):315-9, 350, 349—an abstract.

U.S. Appl. No. 61/591,024, filed Jan. 26, 2012.

Mortimer et al., Peripheral Nerve and Muscle Stimulation, Neuroprosthetics Theory and Practice, Chapter 4.2, 2004, p. 632-638.

An Office Action dated May 19, 2017, which issued during the prosecution of U.S. Appl. No. 14/935,941.

Zabara J., Inhibition of experimental seizures in canines by repetitive vagal stimulation, Epilepsia. Nov.-Dec. 1992;33 (6):1005-12, http://www.ncbi.nlm.nih.gov/pubmed/1464256—an abstract.

A Notice of Allowance dated Jun. 9, 2014, which issued during the prosecution of U.S. Appl. No. 12/796,102.

Notice of Allowance dated Sep. 1, 2017, which issued during the prosecution of U.S. Appl. No. 14/649,873.

G.S. Brindley et al., A technique for anodally blocking large nerve fibers through chronically implanted electrodes, Journal of Neurology, Neurosurgery, and Psychiatry, 1980 (43): 1083-1090.

An Office Action dated Sep. 22, 2016, which issued during the prosecution of U.S. Appl. No. 14/374,375.

DJOGlobal.com—Interferential Current Therapy (IFC).

A Notice of Allowance dated Apr. 25, 2014, which issued during the prosecution of U.S. Appl. No. 13/528,433.

U.S. Appl. No. 61/662,073, filed Jun. 20, 2012.

An Office Action dated Sep. 26, 2013, which issued during the prosecution of U.S. Appl. No. 13/528,433.

U.S. Appl. No. 60/985,353, filed Nov. 5, 2007.

Notice of Allowance dated Jun. 1, 2017, which issued during the prosecution of U.S. Appl. No. 14/601,626.

electrotherapy.org—Interferential Therapy.

Notice of Allowance dated May 17, 2017, which issued during the prosecution of U.S. Appl. No. 14/601,626.

Lind (2012) Advances in spinal cord stimulation.

Physical Therapy Web.com—Interferential Current (IFC) Equipment.

Shealy (1967) Electrical inhibition of pain by stimulation of the dorsal columns.

Nov. 30, 2015 massdevice.com—St. Jude Medical's Proclaim Elite debuts in Europe.

Kaplan et al. (2009) Design and fabrication of an injection tool for neuromuscular microstimulators.

Supplementary European Search Report dated Dec. 22, 2014, which issued during the prosecution of Applicant's European App No. 11792044.7.

An Office Action dated Oct. 30, 2015, which issued during the prosecution of U.S. Appl. No. 14/226,723.

Notice of Allowance dated Nov. 4, 2016, which issued during the prosecution of U.S. Appl. No. 14/601,568.

Sinan Filiz, Luke Xie, Lee E. Weiss, O.B. Ozdoganlar, Micromilling of microbarbs for medical implants, International Journal of Machine Tools and Manufacture, vol. 48, Issues 3-4, Mar. 2008, pp. 459-472.

UCLA Team Reports Initial Success with Trigeminal Nerve Stimulation epilepsy. https://web.archive.org/web/20121020145122/https://www.epilepsy.com/epilepsy/newsletter/apr09_STIM.

Kucklick, Theodore R., ed. The medical device R&D handbook. Chapter 3—Intro to needles and cannulae. CRC Press, 2012.

Szmurlo, R., Starzynski, J., Wincenciak, S. and Rysz, A. (2009) 'Numerical model of vagus nerve electrical stimulation', Compel—The international journal for computation and mathematics in electrical and electronic engineering, 28(1), pp. 211-220.

An Office Action dated Apr. 5, 2017, which issued during the prosecution of U.S. Appl. No. 14/374,375.

Mitchum, A Shocking Improvement in Cardiology Science Life Blog, University of Chicago, http://sciencelife.uchospitals.edu/2010/04/13/a-shocking-improvement-in-cardiology/ (Downloaded Nov. 3, 2012).

Reggiani et al. "Biophysical effects of high frequency electrical field on muscle fibers in culture." (2009) pp. 49-56.

https://www.uroplasty.com/files/pdf/20158.pdf Brochure (Downloaded Oct. 16, 2014).

An Office Action dated Aug. 8, 2016, which issued during the prosecution of U.S. Appl. No. 14/735,741.

An International Search Report and a Written Opinion both dated Jul. 11, 2013, which issued during the prosecution of Applicant's PCT/IL2013/050069.

An International Search Report and a Written Opinion both dated Apr. 29, 2014, which issued during the prosecution of Applicant's PCT/IB2013/060607.

An International Preliminary Report on Patentability dated Jul. 29, 2014, which issued during the prosecution of Applicant's PCT/IL2013/050069.

An International Preliminary Report on Patentability dated Jun. 9, 2015, which issued during the prosecution of Applicant's PCT/IB2013/060607.

An Office Action dated Dec. 12. 2016, which issued during the prosecution of U.S. Appl. No. 14/939,418.

Ex Parte Quayle Action dated Sep. 14. 2016, which issued during the prosecution of U.S. Appl. No. 14/601,568.

(56) References Cited

OTHER PUBLICATIONS

An Office Action dated May 13, 2016, which issued during the prosecution of U.S. Appl. No. 14/601,568.

An Office Action dated Aug. 11, 2016, which issued during the prosecution of U.S. Appl. No. 14/601,626.

CBS news article entitled, "Migraine 'smart' patch tested to help ease pain" by Steven Reinberg.

Zhang, D., Zhang, Z., Zi, Z., Zhang, Y., Zeng, W. and Chu, P.K., 2008. Fabrication of graded TiN coatings on nitinol occluders and effects on in vivo nickel release. Bio-medical materials and engineering, 18(6), pp.387-393—an abstract.

Cardiovascular Stents as Antennas for Implantable Wireless Applications, by Ebrish, BMEN 5151, Apr. 29, 2010.

An Office Action dated Nov. 21, 2016, which issued during the prosecution of U.S. Appl. No. 14/601,626.

Spinal Cord Stimulation advanced level (Mayfield clinic)—dated Feb. 2010.

European Search Report dated February 3. 2017, which issued during the prosecution of Applicant's European App No. 16196878. 9.

Amendment in Response to Official Action dated Jan. 24, 2019 from the United States Patent and Trademark Office in U.S. Appl. No. 15/621,433.

An Office Action dated Dec. 6, 2017, which issued during the prosecution of U.S. Appl. No. 14/601,604.

An Office Action dated Dec. 26, 2017, which issued during the prosecution of U.S. Appl. No. 14/935,941.

An Office Action dated January 8. 2018, which issued during the prosecution of U.S. Appl. No. 14/935,941.

An Office Action dated Mar. 5, 2018, which issued during the prosecution of U.S. Appl. No. 15/360,501.

An Office Action dated Nov. 30, 2017, which issued during the prosecution of U.S. Appl. No. 15/726.971.

Abkenari, Lara Dabiri, et al. "Clinical experience with a novel subcutaneous implantable defibrillator system in a single center." *Clinical Research in Cardiology* 100.9 (2011): 737-744.

St. Jude Medical, Inc. fact sheet entitled, "Peripheral Nerve Stimulation for Intractable Chronic Migraine".

Automatic Impedance Matching for 13.56 MHz NFC Antennas in Proceedings of the 6th Symposium on Communication Systems, Networks and Digital Signal Processing (2008) by Michael Roland, Harald Witschnig, Christian Saminger.

Takahata, K.; DeHennis, A; Wise, K.D.; Gianchandani, Y.B., "Stentenna: a micromachined antenna stent for wireless monitoring of implantable microsensors," in *Engineering in Medicine and Biology Socieijz, 2003. Proceedings of the 25th Annual International Conference of the IEEE*, vol.4, No. pp. 3360-3363 vol. 4, 17-21.

Itchkawitz—OC TechInnovation Blog—Electrodes for implantable defibrillator. Printout from http://octechinnovation.com/tag/cameron-health (Downloaded Mar. 2012).

Kaszala, K. and Ellenbogen, K.A., 2010. Device sensing sensors and algorithms for pacemakers and implantable cardioverter defibrillators. Circulation, 122(13), pp. 1328-1340.

An Office Action dated Apr. 22, 2019, which issued during the prosecution of U.S. Appl. No. 15/638,924.

An Office Action dated Oct. 11. 2018, which issued during the prosecution of U.S. Appl. No. 15/638,924.

Notice of Allowance dated Jan. 17. 2020, which issued during the prosecution of U.S. Appl. No. 15/638,924.

An Interview Summary dated Mar. 5, 2019, which issued during the prosecution of U.S. Appl. No. 15/638,924.

An Advisory Action and an Interview Summary dated Sep. 16. 2019, which issued during the prosecution of U.S. Appl. No. 15/638,924.

An Office Action dated Jan. 24, 2019, which issued during the prosecution of U.S. Appl. No. 15/621,433.

An Office Action dated Jul. 9, 2019, which issued during the prosecution of U.S. Appl. No. 15/621,433.

Office Action dated Oct. 30, 2015, which issued during the prosecution of U.S. Appl. No. 15/621,433.

U.S. Appl. No. 63/282,758, filed Nov. 24, 2021.

An Office Action dated Dec. 5, 2018, which issued during the prosecution of U.S. Appl. No. 15/581,390.

An Office Action dated Jun. 26, 2019, which issued during the prosecution of U.S. Appl. No. 15/395,257.

An Office Action dated Feb. 7, 2019, which issued during the prosecution of U.S. Appl. No. 15/706,956.

Alo, Kenneth M., et al. "Lumbar and sacral nerve root stimulation (NRS) in the treatment of chronic pain: a novel anatomic approach and neuro stimulation technique." Neuromudulation: Technology at the Neural Interface 2.1 (1999): 23-31.

Gofeld, Michael, and John G. Hanlon. "Ultrasound-Guided Placement of a Paddle Lead Onto Peripheral Nerves: Surgical Anatomy and Methodology." Neuromodulation: Technology at the Neural Interface 17.1 (2014): 48-53.

Stuart, R. Morgan, and Christopher J. Winfree. "Neurostimulation techniques for painful peripheral nerve disorders." Neurosurgery Clinics of North America 20.1 (2009): 111-120.

An Office Action dated Jun. 17, 2021, which issued during the prosecution of U.S. Appl. No. 16/363,256.

An Office Action dated Dec. 21, 2020, which issued during the prosecution of U.S. Appl. No. 16/363,256.

An Office Action dated Dec. 2, 2020, which issued during the prosecution of U.S. Appl. No. 16/166,383.

Notice of Allowance dated Aug. 25, 2021, which issued during the prosecution of U.S. Appl. No. 16/737,253.

Notice of Allowance dated Oct. 8, 2021, which issued during the prosecution of U.S. Appl. No. 16/737,253.

Raab, Frederick. "Idealized operation of the class E tuned power amplifier". IEEE transactions on Circuits and Systems 24.12 (1977): 725-735.

\* cited by examiner

BATTERY-OPTIMIZED COMPENSATION SYSTEM

CROSS REFERENCE TO RELATED APPLICATION

The present application claims the priority of U.S. 63/282,758 to Oron, filed Nov. 24, 2021, entitled, "Battery compensation system using RF power amplifier," which is incorporated herein by reference.

FIELD OF THE INVENTION

Applications of the present invention relate to transmitting power to an implanted medical device.

BACKGROUND

Electrical power can be transferred to a medical implant by magnetic induction. A current flowing through a coil produces a magnetic field, which, in turn, will induce a current in a second coil. A coil inside a medical implant can therefore act as a receiving coil, while a coil outside a patient's body can act as a transmitting coil. A current can be driven through the transmitting coil in order to induce an induced current in the receiving coil, thereby powering the medical implant.

U.S. Pat. No. 11,213,685 to Oron et al. which is incorporated herein by reference, describes apparatus for use with a medical implant having a receiving coil. A flexible housing to be placed against skin of a subject includes a flexible transmitting coil and control circuitry for driving a current through the transmitting coil to induce a current in the receiving coil. A sensor coupled to the circuitry determines divergence of a resonance frequency of the transmitting coil when flexed from a nominal resonance frequency of the transmitting coil, occurring in the absence of any forces applied to the transmitting coil. One or more electrical components coupled to the circuitry tune the resonance frequency of the transmitting coil. A switch is coupled to each of the electrical components, the switches including transistors having capacitances that depend on the voltage applied to each switch. The circuitry applies a voltage of 30-300 volts to each switch. Other applications are also described.

U.S. Pat. No. 7,015,769 to Schulman describes an automatic tuning system for a magnetic field generating tuned circuit including a processor configured to maintain the resonant frequency of a tuned circuit equal to a reference frequency. The tuned circuit is driven by a power amplifier whose output provides an amplified signal at the reference frequency. The tuned circuit includes a magnetic field generating inductor and a bank of individually switchable capacitors controlled by the processor capable of adding and removing the respective capacitances to and from the tuned circuit. The inductor includes a Faraday shield to shield the tuned circuit from the influence of electric fields. A power sense circuit monitors the power delivered by the power amplifier to the tuned circuit and the processor sequentially switches the capacitors in a binary progression format to achieve maximum power delivery indicative of conforming the resonant frequency of the tuned circuit to the reference frequency. In an alternate embodiment of the invention, the inductor includes a plurality of taps that provide individually selectable inductance values available for use in the process of conforming the resonant frequency of the tuned circuit to the reference frequency. In further alternate embodiments, the variable capacitor is in the form of a motor driven variable capacitor and the tuning sequence relies on a phase locked loop using the phase of a reference frequency signal and the phase of the inductor current as control parameters. U.S. Pat. No. 9,220,908 to Mashiach describes a sleep apnea treatment device which may include a flexible carrier configured to be implanted in a body of a subject. The device may also include at least one electrode disposed on the flexible carrier, the at least one electrode being configured to modulate nerve fibers of the subject. A flexible antenna may be disposed on the flexible carrier, the flexible antenna electrically connected to the at least one electrode in a manner permitting at least some energy received by the flexible antenna to be transferred to the at least one electrode. The flexible antenna may include: at least a first conductive trace arranged on a first side of the flexible carrier, the at least a first conductive trace defining at least a first elongated space between portions thereof; and at least a second conductive trace arranged on a second side of the flexible carrier, the at least a second conductive trace defining at least a second elongated space between portions thereof, wherein the at least a first conductive trace is at least partially offset from the at least a second conductive trace such that portions of the first conductive trace overly the at least a second elongated space and wherein portions of the second conductive trace underlay the at least a first elongated space.

SUMMARY OF THE INVENTION

In accordance with some applications of the present invention, a transmitting coil is disposed within a housing that is configured to be placed against skin of a subject in order to transmit power to a medical implant. To transmit the power to the medical implant, battery-powered control circuitry activates a power stage, e.g., a power amplifier, to drive a current through the transmitting coil to induce an induced current in a receiving coil of the medical implant. Variations in the impedance of the transmitting coil cause variations in the resonance frequency of the transmitting coil, causing the transmitting coil to act as a variable load for the power stage. The load variation is assumed to occur mostly as variation in the reactance of the transmitting coil (e.g., changes in the inductance and/or capacitance of the transmitting coil), while the resistance of the transmitting coil is almost constant. Changes in inductance and/or capacitance of the transmitting coil may occur, for example, due to the transmitting coil flexing, due to changes in temperature of the transmitting coil, or due to the transmitting coil being in close proximity to metal in the environment of the patient.

As the power stage load varies, i.e., as the resonance frequency of the transmitting coil varies, the resistance of the power supplied to the power stage, i.e., the input resistance to the power stage, varies, which causes the input current to the power stage to vary (since the input voltage to the power stage is kept almost constant). If variations in the resonance frequency of the transmitting coil cause the input resistance of the power stage to drop, this may result in a high input current to the power stage. Since the control circuitry is battery-operated, a high input current to the power stage, i.e., a high current demand on the battery, may cause rapid depletion of the battery and/or may cause the battery to disconnect if the current demand on the battery surpasses a battery overcurrent protection limit for the battery.

For some applications, when transmitting power to a medical implant, the driving frequency of the transmitting coil is held constant at a fixed frequency, or within a set frequency band.

However, variations that occur in the inductance and/or capacitance of the transmitting coil cause a variation in the resonance frequency of the transmitting coil. This in turn causes variations in the system response to the driving frequency as a function of the resonance frequency of the transmitting coil. For example, the RF current at the output of the power stage (i.e., the current driven through the transmitting coil), the input resistance of the power stage, and the efficiency of the power stage all vary as functions of the resonance frequency of the transmitting coil. Thus, a compensation circuit, such as described in the above-referenced U.S. Pat. No. 11,213,685 to Oron et al. may be used for real-time tuning of the transmitting coil in order to compensate for changes in the resonance frequency of the transmitting coil. The control circuitry typically receives input from a sensor and if the sensor determines an indication of divergence of a real-time resonance frequency of the transmitting coil with respect to a reference resonance frequency of the transmitting coil, then the control circuitry utilizes one or more electrical components coupled to the control circuitry to reduce the divergence by tuning the resonance frequency of the transmitting coil.

As noted hereinabove, U.S. Pat. No. 7,015,769 to Schulman describes a power sense circuit that monitors the power delivered by a power amplifier to a tuned circuit and a processor that sequentially switches the capacitors in a binary progression format to achieve maximum power delivery indicative of conforming the resonant frequency of the tuned circuit to the reference frequency. However, the inventors of the present application have realized that when using battery-powered circuitry to drive the transmitting coil, maximizing the current driven through the transmitting coil results in a high current demand on the battery. As such, the inventors have realized that for a battery-powered system, it is advantageous to optimize efficiency of the power stage rather than to optimize the power transmitted to the medical implant. Efficiency of the power stage is defined as power output by the power stage divided by power input to the power stage.

Thus, the inventors have realized that it is advantageous to a battery-operated power transmission system to set the reference resonance frequency of the transmitting coil (from which divergences of the real-time resonance frequency are reduced) such that both of the following two conditions are met at the reference resonance frequency of the transmitting coil:

(a) efficiency of the power stage is at least 70% of a maximum efficiency of the power stage as a function of the resonance frequency of the transmitting coil, and (b) the current driven through the transmitting coil is less than 96% of a maximum current drivable through the transmitting coil as a function of the resonance frequency of the transmitting coil.

(Thus, if for example the maximum efficiency of the power stage as a function of the resonance frequency of the transmitting coil is 80%, then the efficiency of the power stage being at least 70% of the maximum efficiency of the power stage as a function of the resonance frequency means that the efficiency of the power stage is at least 70%*80%=56%.)

In the present application, various parameters (such as the efficiency of the power stage and the current drivable through the transmitting coil) are described as varying as a function of the resonance frequency of the transmitting coil. This is to be understood as relating to the resonance frequency varying while the output voltage of the power stage is held constant.

The inventors have realized that when the power stage is operating near its maximum efficiency (i) the efficiency of the power stage varies slowly with changes in the resonance frequency of the transmitting coil while (ii) the input resistance of the power stage varies quickly with changes in the resonance frequency of the transmitting coil. As such, even at maximum efficiency of the power stage, a variation in resonance frequency of the transmitting coil may cause the input resistance of the power stage to quickly decrease or increase, which in turn may cause the input current to the power stage to increase or decrease, respectively. Thus, in this regard, the inventors have realized that it is advantageous to a battery-operated power transmission system to set the reference resonance frequency of the transmitting coil (from which divergences of the real-time resonance frequency are reduced) such that both of the following two conditions are met at the reference resonance frequency of the transmitting coil:

(a) efficiency of the power stage is less than 95% (while nevertheless at least 70%) of a maximum efficiency of the power stage as a function of the resonance frequency of the transmitting coil, and (b) the current driven through the transmitting coil is less than 96% of a maximum current drivable through the transmitting coil as a function of the resonance frequency of the transmitting coil.

There is therefore provided, in accordance with some applications of the present invention, apparatus for use with a medical implant that comprises a receiving coil, the apparatus including:

a housing configured to be placed against skin of a subject;

a transmitting coil disposed in the housing;

control circuitry including a power stage and configured to transmit power to the medical implant by activating the power stage to drive a current through the transmitting coil to induce an induced current in the receiving coil;

a battery coupled to the housing and configured to power the control circuitry;

a sensor configured to determine an indication of divergence of (i) a real-time resonance frequency of the transmitting coil, with respect to (ii) a reference resonance frequency of the transmitting coil at which:

(a) efficiency of the power stage is at least 70% of a maximum efficiency of the power stage as a function of the resonance frequency of the transmitting coil, the efficiency of the power stage defined as power output by the power stage divided by power input to the power stage, and (b) the current driven through the transmitting coil is less than 96% of a maximum current drivable through the transmitting coil as a function of the resonance frequency of the transmitting coil; and one or more electrical components, coupled to the control circuitry, wherein the control circuitry is configured to receive an input from the sensor indicative of the divergence and use the one or more electrical components to reduce the divergence by tuning the resonance frequency of the transmitting coil in response to the determination of the sensor.

For some applications, the housing is a flexible housing.

For some applications, the transmitting coil is a flexible transmitting coil and the real-time resonance frequency is a flexed resonance frequency when the transmitting coil is flexed.

For some applications, the control circuitry is configured to transmit power to the medical implant by activating the power stage to drive the current at a fixed frequency through the transmitting coil to induce the induced current in the receiving coil.

For some applications, the control circuitry is configured to transmit power to the medical implant by activating the power stage to drive the current at a fixed frequency of 6.78 MHz through the transmitting coil to induce the induced current in the receiving coil.

For some applications, the control circuitry is configured to transmit power to the medical implant by activating the power stage to drive the current within a set frequency band through the transmitting coil to induce the induced current in the receiving coil.

For some applications, the control circuitry is configured to transmit power to the medical implant by activating the power stage to drive the current within the set frequency band, wherein the set frequency band is a range of frequencies that includes 6.78 MHz within the range.

For some applications, the control circuitry is configured such that the reference resonance frequency of the transmitting coil is lower than a resonance frequency of the transmitting coil at which the efficiency of the power stage is the maximum efficiency.

For some applications, the control circuitry is configured such that the reference resonance frequency of the transmitting coil is a resonance frequency of the transmitting coil at which the efficiency of the power stage is less than 95% of the maximum efficiency.

For some applications, the control circuitry is configured such that the reference resonance frequency of the transmitting coil is a resonance frequency of the transmitting coil at which the efficiency of the power stage is at least 75% of the maximum efficiency.

The present invention will be more fully understood from the following detailed description of applications thereof, taken together with the drawings, in which:

DETAILED DESCRIPTION

Figure 1A:
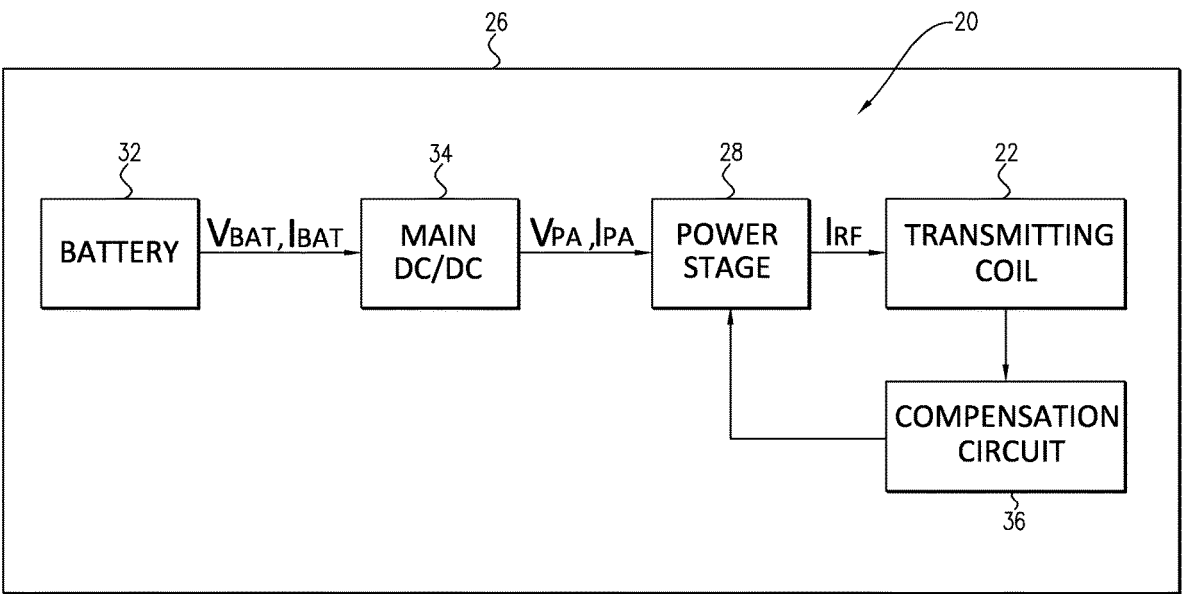
FIG. 1A is a block diagram of control circuitry used to drive a transmitting coil to power a medical implant, in accordance with some applications of the present invention.

Reference is now made to FIG. 1A, which is a block diagram of control circuitry 20 used to drive a transmitting coil 22 to power a medical implant 24 (shown in FIG. 1B), in accordance with some applications of the present invention. Transmitting coil 22 is disposed within a housing 26 that is configured to be placed against skin 27 of a subject. Control circuitry 20 includes a power stage 28, e.g., a power amplifier ("PA" in the figures), and transmits power to medical implant 24 by activating power stage 28 to drive a current through transmitting coil 22 to induce an induced current in a receiving coil 30 of medical implant 24. A battery 32 is coupled to housing 26 and configured to power control circuitry 20. For some applications the current ($I_{BAT}$) from battery 32 goes through a DC/DC converter 34 before entering power stage 28. As further described hereinbelow, a compensation circuit 36 (e.g., comprising switchable capacitors and/or inductors), such as described in the above-referenced U.S. Pat. No. 11,213,685 to Oron et al., may be used for real-time tuning of transmitting coil 22 in order to compensate for changes in the resonance frequency of transmitting coil 22. Control circuitry 20 typically receives input from a sensor 38 (FIG. 1B) that is configured to determine an indication of divergence of (i) a real-time resonance frequency of transmitting coil 22, with respect to (ii) a reference resonance frequency of transmitting coil 22, further described hereinbelow. If a divergence is indicated, then control circuitry 20 utilizes one or more electrical components coupled to control circuitry 20 to reduce the divergence by tuning the resonance frequency of transmitting coil 22 in response to the determination of sensor 38. For example, techniques described with reference to FIGS. 8-14 in the above-referenced U.S. Pat. No. 11,213,685 may be utilized in combination with the apparatus described herein to tune the resonance frequency of transmitting coil 22.

Figure 1B:
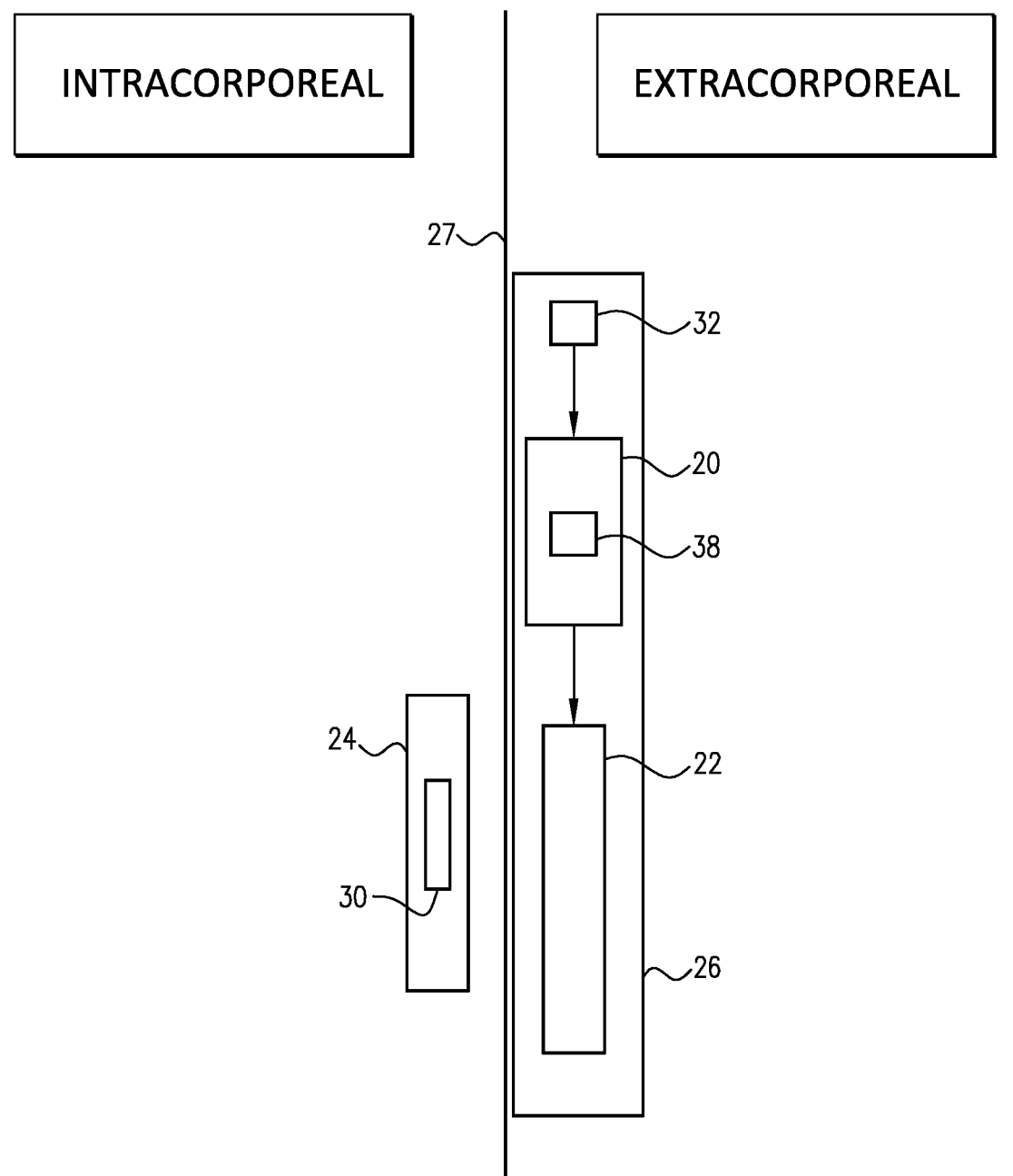
FIG. 1B is a schematic illustration of a housing placed against skin of a subject, and a medical implant implanted under the skin of the subject, in accordance with some applications of the present invention.

Reference is now made to FIG. 1B, which is a schematic illustration of housing 26 placed against skin 27 of a subject, and medical implant 24 implanted under skin 27 of the subject, in accordance with some applications of the present invention. Battery 32 is coupled to the housing and powers control circuitry 20. Control circuitry 20 and transmitting coil 22 are shown disposed within housing 26. Medical implant 24 including receiving coil 30 is shown to be implanted in the subject in contact with tissue of the subject.

Figure 2:
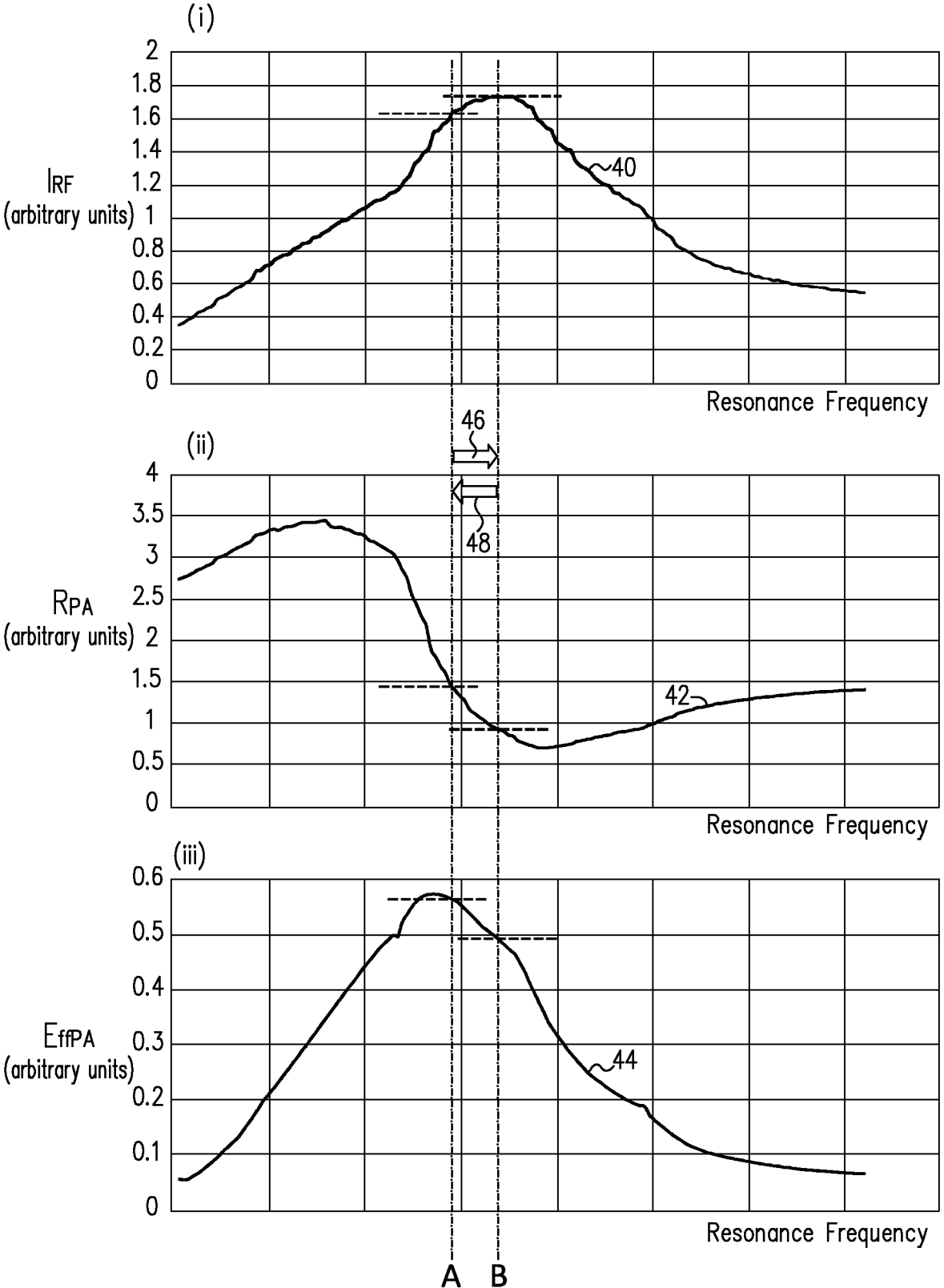
FIGS. 2-4 show graphs depicting, respectively, RF current at the output of a power stage of the control circuitry, the input resistance of the power stage, and the efficiency of the power stage, all plotted as functions of resonance frequency of the transmitting coil.

Reference is now made to FIG. 2, which shows graphs (i), (ii), and (iii) depicting, respectively, the RF current ($I_{RF}$) at the output of power stage 28, the input resistance ($R_{PA}$) of power stage 28, and the efficiency of power stage 28, when operated at a set fixed frequency, all plotted as functions of the resonance frequency of transmitting coil 22, in accordance with some applications of the present invention. As described hereinabove, variations in impedance of transmitting coil 22 cause variations in the resonance frequency of transmitting coil 22, causing transmitting coil 22 to act as a variable load for power stage 28.

For some applications, control circuitry 20 transmits power to medical implant 24 by activating power stage 28 to drive the current at a fixed frequency (e.g., 6.78 MHz), or within a set frequency band (e.g., 6.765-6.795 MHz), through transmitting coil 22 to induce the induced current in receiving coil 30. Each vertical line in FIG. 2 spanning graphs (i), (ii), and (iii) represents a specific resonance frequency of transmitting coil 22. The intersections of each vertical line with the respective curves 40, 42, and 44 of graphs (i), (ii), and (iii) indicate, respectively, the RF current ($I_{RF}$) at the output of power stage 28 (i.e., the current driven through transmitting coil 22), the input resistance ($R_{PA}$) of power stage 28, and the efficiency of power stage 28 at the specific resonance frequency of transmitting coil 22 represented by the vertical line.

For some applications for a given power transmission system, a reference resonance frequency of transmitting coil 22 is set such that one or more parameters of the system are optimized (further described hereinbelow) when transmitting coil 22 is at the reference resonance frequency, i.e., a reference resonance frequency is set at which transmitting coil 22 should ideally be maintained. However, for some applications, changes may occur in the inductance and/or capacitance of transmitting coil 22 (e.g., due to flexing of transmitting coil 22) during operation of transmitting coil 22, causing a real-time resonance frequency of transmitting coil 22 to vary and thus diverge from the reference resonance frequency of transmitting coil 22.

For example, if the reference resonance frequency of transmitting coil 22 is set to be at vertical line A in FIG. 2 (selected in FIG. 2 for illustrative purposes to be somewhat to the left of the peak of curve 40), a change in inductance and/or capacitance of transmitting coil 22 may cause the real-time resonance frequency of transmitting coil 22 to diverge from vertical line A, such that the real-time resonance frequency of transmitting coil 22 is at vertical line B. This divergence is illustrated by arrow 46 in FIG. 2. As shown by the intersections of vertical lines A and B with curves 40, 42, and 44, the divergence of the real-time resonance frequency of transmitting coil 22 causes (a) the magnitude of the power transmission to medical implant 24 to change due to the change in RF current ($I_{RF}$) driven through transmitting coil 22, (b) the amount of current ($I_{BAT}$) being drawn from battery 32 to change due to the change in the input resistance ($R_{PA}$) of power stage 28, and (c) the efficiency of power stage 28 to change. Thus, given the particular locations of vertical lines A and B, the divergence of the real-time resonance frequency of transmitting coil 22 causes (a) the magnitude of the power transmission to medical implant 24 to increase, (b) the amount of current ($I_{BAT}$) being drawn from battery 32 to increase, and (c) the efficiency of power stage 28 to decrease.

Compensation circuit 36 is used for real-time tuning of transmitting coil 22 in order to compensate for these changes in the resonance frequency of transmitting coil 22. As described hereinabove, control circuitry 20 receives input from sensor 38, which is configured to determine an indication of divergence of (i) the real-time resonance frequency of transmitting coil 22, with respect to (ii) the reference resonance frequency of transmitting coil 22, further described hereinbelow. If a divergence is indicated, then control circuitry 20 utilizes one or more electrical components coupled to control circuitry 20 to reduce the divergence by tuning the resonance frequency of transmitting coil 22 in order to return it to the reference resonance frequency. The tuning of transmitting coil 22 back to the reference resonance frequency is illustrated by arrow 48 in FIG. 2.

For some applications, housing 26 and transmitting coil 22 are flexible, and changes in the inductance and/or capacitance of transmitting coil 22 may be due to transmitting coil 22 flexing (e.g., due to patient movement), such that the real-time resonance frequency of transmitting coil 22 is a flexed resonance frequency of transmitting coil 22. For some applications, changes in inductance and/or capacitance of transmitting coil 22 may be occur due to changes in temperature of transmitting coil 22 or due to transmitting coil 22 being in close proximity to metal in the environment of the patient.

Reference is now made to FIG. 3, which again shows graphs (i), (ii), and (iii) depicting, respectively, the RF current ($I_{RF}$) at the output of power stage 28, the input resistance ($R_{PA}$) of power stage 28, and the efficiency of power stage 28, all plotted as functions of the resonance frequency of transmitting coil 22, in accordance with some applications of the present invention. As noted hereinabove, U.S. Pat. No. 7,015,769 to Schulman describes a power sense circuit that monitors the power delivered by a power amplifier to a tuned circuit and a processor that sequentially switches the capacitors in a binary progression format to achieve maximum power delivery indicative of conforming the resonant frequency of the tuned circuit to the reference frequency.

Figure 3:
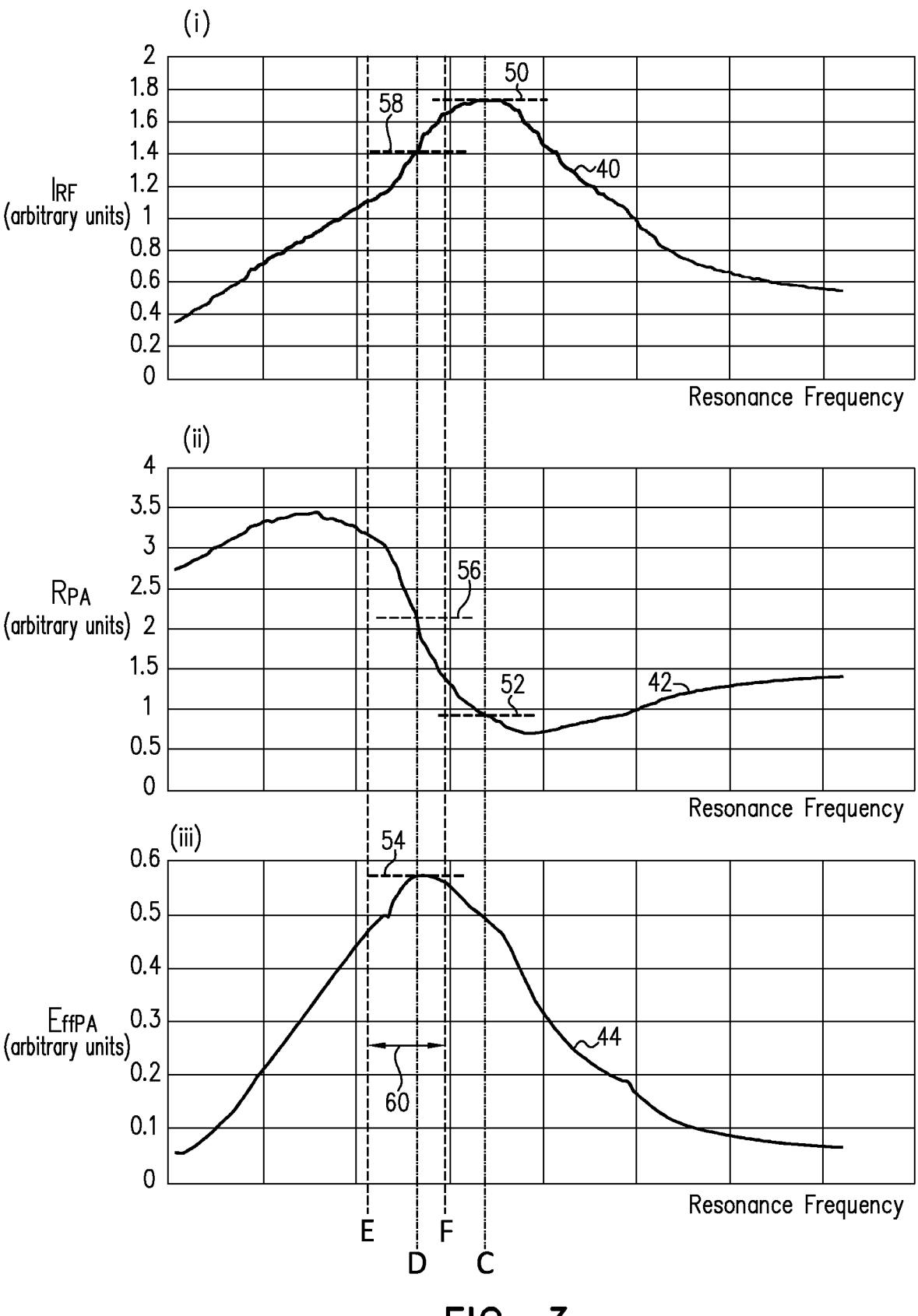

However, the inventors have determined that, as shown by vertical line C in FIG. 3, when the RF current ($I_{RF}$) at the output of power stage 28 is maximized, illustrated by horizontal dashed line 50 on graph (i), the input resistance ($R_{PA}$) of power stage 28 drops quite low, illustrated by horizontal dashed line 52 on graph (ii). The input voltage ($V_{PA}$) to power stage 28 is typically kept almost constant and as such, if the input resistance ($R_{PA}$) drops, the input current ($I_{PA}$) to power stage 28 will increase. Since control circuitry 20 is battery-operated, a high input current ($I_{PA}$) to power stage 28, i.e., a high current demand on battery 32, may cause rapid depletion of battery 32 and/or may cause battery 32 to disconnect if the current demand on the battery surpasses a battery overcurrent protection limit for the battery.

Thus, the inventors have realized that in order to increase the life of battery 32 it is advantageous to set the reference resonance frequency of transmitting coil 22 such that when transmitting coil 22 is at the reference resonance frequency the efficiency of power stage 28 is at or near its maximum. For a given power output, when power stage 28 is operating at its maximum efficiency, a minimum power input is required in order to achieve the given power output. Being able to use a minimum power input to power stage 28 for the same power output results in battery 32 operating for a longer duration. As shown by vertical line D on FIG. 3, when efficiency of power stage 28 is at its maximum, illustrated by horizontal dashed line 54 on graph (iii), the input resistance ($R_{PA}$) of power stage 28 is considerably higher, illustrated by horizontal dashed line 56 on graph (ii). When the input resistance ($R_{PA}$) of power stage 28 is higher, the input current ($I_{PA}$) to power stage 28, and thus the amount of current ($I_{BAT}$) being drawn from battery 32, is lower. Therefore, whereas maintaining the resonance frequency of transmitting coil 22 in a manner that maximizes efficiency of power stage 28 lowers the amount of power transmitted to medical implant 24 (i.e., the RF current ($I_{RF}$) at the output of power stage 28 is lower, illustrated by horizontal dashed line 58 on graph (i)), it extends the life of battery 32 due to the lower current demand on battery 32.

It is noted that, for some applications, the reference resonance frequency of transmitting coil 22 may be set so that the efficiency of power stage 28 is near maximum or within a certain range of maximum efficiency. This range is typically selected such that the efficiency of power stage 28 does not drop significantly from the maximum efficiency and such that the RF current ($I_{RF}$) at the output of power stage 28 does not exceed a certain level (in order to avoid being near maximum RF current and thus rapidly depleting the battery or surpassing the battery overcurrent protection limit). Thus, for some applications, the reference resonance frequency of transmitting coil 22 is set such that at the reference resonance frequency of transmitting coil 22 (a) efficiency of power stage 28 (i.e., efficiency of the power delivered from power stage 28 to the variable load) is at least 70% of a maximum efficiency of power stage 28 as a function of the resonance frequency of transmitting coil 22, and (b) the current driven through transmitting coil 22 (i.e., the RF current ($I_{RF}$) at the output of power stage 28) is less than 96% of a maximum current drivable through transmitting coil 22 as a function of the resonance frequency of transmitting coil 22. This range for the reference resonance frequency of transmitting coil 22 is illustrated in FIG. 3 by double headed arrow 60 between dashed vertical lines E and F.

It is noted that for some applications the real-time resonance frequency of transmitting coil 22 is measured when the device is first activated, under static conditions. For example, for some applications, the specific load configuration of transmitting coil 22 for the reference resonance frequency is found by scanning the different configurations of compensation circuit 36 upon activation of the device under static conditions (i.e., under conditions in which the inductance and capacitance of transmitting coil 22 stays constant) in order to find the optimal efficiency point. Compensation circuit 36 is cycled through various load configurations each resulting in a respective real-time resonance frequency of transmitting coil 22 for which the corresponding efficiency of power stage 28 is determined. By comparing the efficiency of power stage 28 for different load configurations, an optimal load configuration is found for transmitting coil 22 that provides near maximum efficiency of power stage 28 for the given driving frequency. If a change to the load occurs during operation, sensor 38 identifies it and control circuitry 20 uses compensation circuit 36 to restore the load to the best efficiency point by adjusting compensation circuit 36. For some applications, the efficiency of power stage 28 at each load configuration may be determined as follows:

the RF current ($I_{RF}$) is measured at the output of power stage 28;

the input voltage ($V_{PA}$) is measured at the input to power stage 28;

the input current ($I_{PA}$) is measured at the input to power stage 28;

the efficiency of power stage 28 ($Eff_{PA}$) is defined as:

$$Eff_{PA}=(P_{OUT})/(P_{IN}) \qquad \text{[Eqn. 1]}$$

where $P_{OUT}$ is the power output by power stage 28 and $P_{IN}$ is the power input to power stage 28;

assuming that the resistive part of the load does not vary, $P_{OUT}$ is proportional to the square of $I_{RF}$ (for some applications, a correction for a change in the load resistive part can be also implemented); and $P_{IN}$ may be calculated from the input voltage ($V_{PA}$) to power stage 28 and the input current ($I_{PA}$) to power stage 28 as follows:

$$P_{IN}=V_{PA}*I_{PA}[ \qquad \text{Eqn.2}$$

(Alternatively to calculating and using $P_{IN}$ as described throughout the application and recited in the claims, another indication of power may be used, e.g., $P_{BAT}$ (calculated from the voltage ($V_{BAT}$) and current ($I_{BAT}$) being drawn from battery 32, i.e., $P_{BAT}=V_{BAT}*I_{BAT}$) or another indicator of power that relates to the power coming out of the battery (for example, in cases where the current ($I_{BAT}$) from battery 32 goes through DC/DC converter 34 before entering power stage 28, the power leaving battery 32 is the power input to DC/DC converter 34).)

Reference is now made to FIG. 4, which again shows graphs (i), (ii), and (iii) depicting, respectively, the RF current ($I_{RF}$) at the output of power stage 28, the input resistance ($R_{PA}$) of power stage 28, and the efficiency of power stage 28, all plotted as functions of the resonance frequency of transmitting coil 22, in accordance with some applications of the present invention. The inventors have further realized that for some applications, even when efficiency of power stage 28 is maximized at the reference resonance frequency of transmitting coil 22 (thus elongating the life of battery 32), dynamic changes of the real-time resonance frequency of transmitting coil 22 starting from the point of maximum efficiency may cause the input resistance ($R_{PA}$) of power stage 28 during operation to suddenly decrease to a point where the current ($I_{BAT}$) drawn from battery 32 may pass the battery overcurrent protection limit. As described hereinabove, this is because near the maximum efficiency of power stage 28, curve 42 representing the input resistance ($R_{PA}$) of power stage 28 has a very steep slope, i.e., at resonance frequencies of transmitting coil 22 that result in maximum or near maximum efficiency of power stage 28 the input resistance ($R_{PA}$) of power stage 28 changes very quickly in response to small changes in the real-time resonance frequency of transmitting coil 22. For some cases compensation circuit 36 is used to restore the real-time resonance frequency of transmitting coil 22 to the reference resonance frequency. However, in some cases a change in resonance frequency of transmitting coil 22 may occur at a faster rate than compensation circuit 36 is configured to accommodate for. For example, control circuitry 20 may check the resonance frequency of transmitting coil 22, using sensor 38, at a sampling rate that may be as low as 10 Hz, e.g., the sampling rate may be 10-100 Hz, e.g., 10-30 Hz.

Figure 4:
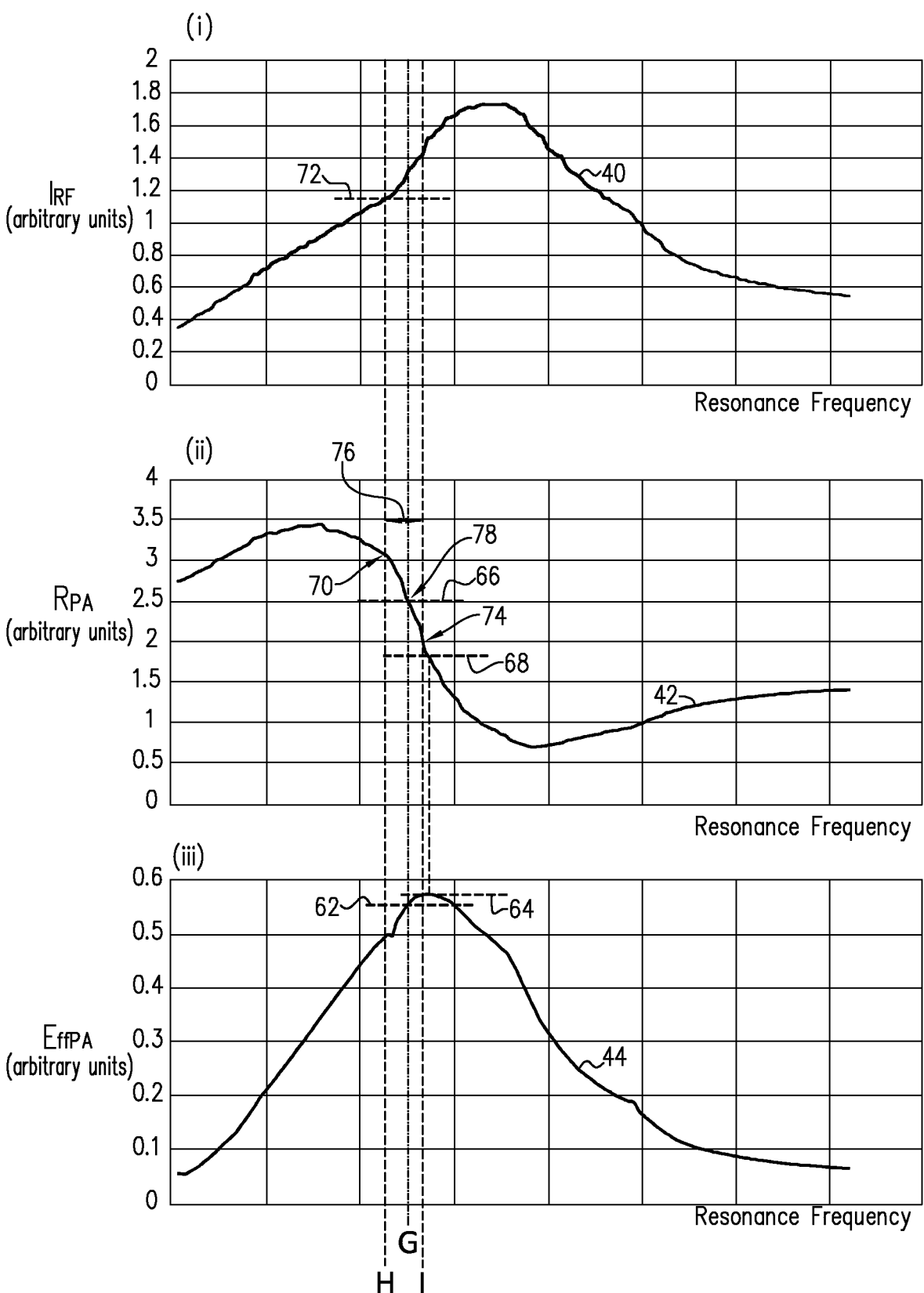

Due to curve 44 (efficiency of power stage 28) having a rounded peak, while curve 42 (input resistance ($R_{PA}$) of power stage 28) has a steep slope over the same range of resonance frequencies, the inventors have realized that it is advantageous to set the reference resonance frequency of transmitting coil 22 to be slightly to the left of the peak of curve 44, as illustrated by vertical line G in FIG. 4, i.e., the reference resonance frequency of transmitting coil 22 is lower than a resonance frequency of transmitting coil 22 at which the efficiency of power stage 28 is the maximum efficiency. As shown, vertical line G intersects curve 44 at an efficiency (horizontal dashed line 62) that is only slightly less than the maximum efficiency (horizontal dashed line 64), while vertical line G intersects curve 42 at an input resistance ($R_{PA}$) of power stage 28 (horizontal dashed line 66) that is substantially higher than the input resistance ($R_{PA}$) of power stage 28 would be when the efficiency of power stage 28 is at its maximum (horizontal dashed line 68). Thus, while still staying near maximum efficiency of power stage 28, setting the reference resonance frequency to be slightly to the left of the efficiency peak increases the likelihood that dynamic changes of the real-time resonance frequency that occur during operation nevertheless result in an input resistance ($R_{PA}$) of power stage 28 that is sufficiently high as to avoid the current ($I_{BAT}$) drawn from battery 32 surpassing the battery overcurrent protection limit. Therefore, for some applications, the reference resonance frequency of transmitting coil 22 is a resonance frequency of transmitting coil 22 at which the efficiency of power stage 28 is less than 95% of the maximum efficiency.

For some applications, in order to find an optimum input resistance ($R_{PA}$) of power stage 28 for use in setting the reference resonance frequency of transmitting coil 22, a range for the input resistance ($R_{PA}$) of power stage 28 is defined based on the expected dynamic load change of the system. This range for the input resistance ($R_{PA}$) of power stage 28 is illustrated in FIG. 4 by double headed arrow 76 between dashed vertical lines H and I. The range is defined such that over the entire range (i) enough power is transmitted for medical implant 24 to operate, (ii) efficiency of power stage 28 remains near maximum efficiency, and (iii) the current ($I_{BAT}$) drawn from battery 32 does not pass the battery overcurrent protection limit. For some applications, an upper limit ($R_{PA}$-max) of this range (illustrated by arrow 70) is set such that the RF current ($I_{RF}$) does not drop below a threshold level (horizontal dashed line 72) in order to ensure that enough power is transmitted for medical implant 24 to operate. For some applications the lower limit ($R_{PA}$-min) of this range (illustrated by arrow 74) is set by the battery overcurrent protection limit, i.e., the lower limit ($R_{PA}$-min) is set such that the current ($I_{BAT}$) drawn from battery 32 stays below the battery overcurrent protection limit. The optimum input resistance ($R_{PA}$) of power stage 28 for use in setting the reference resonance frequency of transmitting coil 22 is within this range, e.g., at the average of the $R_{PA}$-max and the $R_{PA}$-min (illustrated by arrow 78).

Thus, for some applications, control circuitry 20 is configured such that the reference resonance frequency of transmitting coil 20 is a resonance frequency of transmitting coil 22 at which the efficiency of power stage 28 is (a) less than 95% of the maximum efficiency of power stage 28 as a function of the resonance frequency of transmitting coil 22 (so as to avoid surpassing the battery overcurrent protection limit), and (b) at least 75%, e.g., at least 80% of the maximum efficiency of power stage 28 as a function of the resonance frequency of transmitting coil 22 (so as to ensure enough power to operate medical implant 24). For some applications, control circuitry 20 is configured such that the reference resonance frequency of transmitting coil 20 is a resonance frequency of transmitting coil 22 at which the current driven through transmitting coil 22 (i.e., RF current ($I_{RF}$) at the output of power stage 28) is at least 10% greater than a minimum current that is required to drive medical implant 24.

For some applications, upon activation of the control circuitry 20, the compensation circuit is scanned to first find the specific load configuration, i.e., the specific resonance frequency of transmitting coil 22 that results in the maximum efficiency of power stage 28 (as described hereinabove). Subsequently, over a range of resonance frequencies that is to the left of the peak of curve 44, the input resistance ($R_{PA}$) of power stage 28 is scanned in order to find $R_{PA}$-max and $R_{PA}$-min for the system (as described hereinabove). The input resistance ($R_{PA}$) of power stage 28 is scanned by measuring the respective input voltages ($V_{PA}$) and input currents ($I_{PA}$) at the input to power stage 28 over the range of resonance frequencies. Once the $R_{PA}$-max and $R_{PA}$-min are found, the optimum input resistance ($R_{PA}$) of power stage 28 is selected between $R_{PA}$-max and $R_{PA}$-min, e.g., the average of $R_{PA}$-max and $R_{PA}$-min. The resonance frequency of transmitting coil 22 that results in the optimum input resistance ($R_{PA}$) of power stage 28 is set as the reference resonance frequency of transmitting coil 22.

For some applications, sensor 38 includes a phase detector, such as the phase detector disclosed in the above-referenced U.S. Pat. No. 11,213,685 to Oron et al. For example, the phase difference between the modulation driving power stage 28 and the RF current ($I_{RF}$) may be detected at the reference resonance frequency of transmitting coil 22. As the load changes, i.e., as the resonance frequency of transmitting coil 22 changes, the phase of the RF current ($I_{RF}$) changes. Thus, the phase detector may then be used to determine the indication of the divergence of the real-time resonance frequency of transmitting coil 22 with respect to the reference resonance frequency of transmitting coil 22.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for use with a medical implant that comprises a receiving coil, the apparatus comprising:
   a housing configured to be placed against skin of a subject;
   a transmitting coil disposed in the housing;
   control circuitry comprising a power stage and configured to transmit power to the medical implant by activating the power stage to drive a current through the transmitting coil to induce an induced current in the receiving coil;
   a battery coupled to the housing and configured to power the control circuitry;
   a sensor configured to determine an indication of divergence of
     (i) a real-time resonance frequency of the transmitting coil, with respect to
     (ii) a reference resonance frequency of the transmitting coil at which:
       (a) efficiency of the power stage is at least 70% of a maximum efficiency of the power stage as a function of the resonance frequency of the transmitting coil, the efficiency of the power stage defined as power output by the power stage divided by power input to the power stage, and
       (b) the current driven through the transmitting coil is less than 96% of a maximum current drivable through the transmitting coil as a function of the resonance frequency of the transmitting coil; and
   one or more electrical components, coupled to the control circuitry,
     wherein the control circuitry is configured to receive an input from the sensor indicative of the divergence and use the one or more electrical components to reduce the divergence by tuning the resonance frequency of the transmitting coil in response to the determination of the sensor.

2. The apparatus according to claim 1, wherein the housing is a flexible housing.

3. The apparatus according to claim 1, wherein the transmitting coil is a flexible transmitting coil and wherein the real-time resonance frequency is a flexed resonance frequency when the transmitting coil is flexed.

4. The apparatus according to claim 1, wherein the control circuitry is configured to transmit power to the medical implant by activating the power stage to drive the current at a fixed frequency through the transmitting coil to induce the induced current in the receiving coil.

5. The apparatus according to claim 4, wherein the control circuitry is configured to transmit power to the medical implant by activating the power stage to drive the current at a fixed frequency of 6.78 MHz through the transmitting coil to induce the induced current in the receiving coil.

6. The apparatus according to claim 1, wherein the control circuitry is configured to transmit power to the medical implant by activating the power stage to drive the current within a set frequency band through the transmitting coil to induce the induced current in the receiving coil.

7. The apparatus according to claim 6, wherein the control circuitry is configured to transmit power to the medical implant by activating the power stage to drive the current within the set frequency band, wherein the set frequency band is a range of frequencies that includes 6.78 MHz within the range.

8. The apparatus according to claim 1, wherein the control circuitry is configured such that the reference resonance frequency of the transmitting coil is lower than a resonance frequency of the transmitting coil at which the efficiency of the power stage is the maximum efficiency.

9. The apparatus according to claim 8, wherein the control circuitry is configured such that the reference resonance frequency of the transmitting coil is a resonance frequency of the transmitting coil at which the efficiency of the power stage is less than 95% of the maximum efficiency.

10. The apparatus according to claim 9, wherein the control circuitry is configured such that the reference resonance frequency of the transmitting coil is a resonance frequency of the transmitting coil at which the efficiency of the power stage is at least 75% of the maximum efficiency.

\* \* \* \* \*